US012223934B2

(12) United States Patent
Yamaguchi

(10) Patent No.: US 12,223,934 B2
(45) Date of Patent: Feb. 11, 2025

(54) KEYBOARD DEVICE FOR KEYBOARD INSTRUMENT

(71) Applicant: KABUSHIKI KAISHA KAWAI GAKKI SEISAKUSHO, Hamamatsu (JP)

(72) Inventor: Tsutomu Yamaguchi, Hamamatsu (JP)

(73) Assignee: KABUSHIKI KAISHA KAWAI GAKKI SEISAKUSHO, Hamamatsu (JP)

( * ) Notice: Subject to any disclaimer, the term of this patent is extended or adjusted under 35 U.S.C. 154(b) by 567 days.

(21) Appl. No.: 17/656,399

(22) Filed: Mar. 24, 2022

(65) Prior Publication Data

US 2022/0310050 A1 Sep. 29, 2022

(30) Foreign Application Priority Data

Mar. 29, 2021 (JP) .................................. 2021-54603
Mar. 29, 2021 (JP) .................................. 2021-54604
Mar. 29, 2021 (JP) .................................. 2021-54605
Mar. 29, 2021 (JP) .................................. 2021-54606

(51) Int. Cl.
*G10H 1/34* (2006.01)
*G10C 3/12* (2006.01)

(52) U.S. Cl.
CPC ............... *G10H 1/344* (2013.01); *G10C 3/12* (2013.01)

(58) Field of Classification Search
CPC ...................................................... G10H 1/344
See application file for complete search history.

(56) References Cited

U.S. PATENT DOCUMENTS 10,847,130 B2 * 11/2020 Terai ...................... G10H 1/346
11,017,749 B2 * 5/2021 Tsuzuku .................. G10C 3/12

FOREIGN PATENT DOCUMENTS

JP 2010-286694 A 12/2010
JP 2019053107 A * 4/2019
JP 2019056743 A * 4/2019
JP 2019056781 A * 4/2019
JP 2020-52391 A 4/2020

* cited by examiner

*Primary Examiner* — Robert W Horn
(74) *Attorney, Agent, or Firm* — Lewis Roca Rothgerber Christie LLP

(57) ABSTRACT

A keyboard device for a keyboard instrument includes a plurality of key support mechanisms each provided in a state engaged with a keyboard chassis and supporting an associated key from below, for causing, upon key depression, the depressed key to operate such that the key pivotally moves about a virtual pivot located rearward of a rear end of the key. Each key support mechanism includes first and second arms each extending a predetermined length in a front-rear direction and configured to be swingable. The first and second arms are pivotally and slidably connected to each other. A rear-side connecting portion of the key includes a connecting body portion and a pair of engagement protrusions, and a rear-side connecting portion of the second arm includes two connecting arm portions having a bifurcated shape and formed with connecting holes.

21 Claims, 9 Drawing Sheets

KEYBOARD DEVICE FOR KEYBOARD INSTRUMENT

CROSS-REFERENCE TO RELATED APPLICATION(S)

This application claims priority to Japanese Patent Application Number 2021-54603, filed on Mar. 29, 2021, Japanese Patent Application Number 2021-54604, filed on Mar. 29, 2021, Japanese Patent Application Number 2021-54605, filed on Mar. 29, 2021, Japanese Patent Application Number 2021-54606, filed on Mar. 29, 2021, the entire content of each of which is incorporated herein by reference.

BACKGROUND OF THE INVENTION

Field of the Invention

The present invention relates to a keyboard device which is applied to a keyboard instrument, such as an electronic piano, and has keys pivotally connected and supported from below, in which a depressed one of the keys operates such that it pivotally moves about a virtual pivot located rearward of a rear end of the key.

Description of the Related Art

Conventionally, as this type of a keyboard device, there has been known, for example, one disclosed in Japanese Laid-Open Patent Publication (Kokai) No. 2020-52391 already filed by the present applicant. This keyboard device is comprised of a horizontally extending plate-like base, a plurality of keys provided above the base and extending a predetermined length in a front-rear direction, and a plurality of linkages provided on the base and supporting respective keys from below. Each linkage includes a front-side connecting link bar extending a predetermined length in the front-rear direction with a front end thereof pivotally connected to a front portion of an associated one of the keys, and a rear-side connecting link bar extending a predetermined length in the front-rear direction with a rear end thereof pivotally and slidably connected to a rear end of the associated key. These front-side connecting link bar and rear-side connecting link bar are each pivotally supported at or in the vicinity of a longitudinal center thereof, and are pivotally and slidably connected to each other. Each of the front-side connecting link bar and the rear-side connecting link bar is formed by a long narrow metal plate and is formed into a predetermined shape.

In the keyboard device constructed as described above, when a front end of one of the keys is pressed down by key depression, the front-side connecting link bar and the rear-side connecting link bar pivotally move in predetermined directions, respectively. When the front end of the key reaches its lowest position, the front end of the key is positioned lower by a predetermined distance (e.g. 10 mm) than in a key-released state, and the rear end of the same moves downward by a predetermined distance (e.g. 5 mm) which is approximately half the above-mentioned predetermined distance. That is, in this keyboard device, when a key is depressed, the key pivotally moves about the virtual pivot, as if there is a pivot (virtual pivot) at a predetermined location rearward of the rear end of the key.

Further, as a keyboard device in which each key pivotally moves about a virtual pivot located rearward of the key, there has been known one disclosed in Japanese Laid-Open Patent Publication (Kokai) No. 2010-286694. This keyboard device is comprised of a frame having a predetermined shape, a base end portion provided at a rear end of the frame, a plurality of keys arranged forward of the base end portion and each extending in a front-rear direction, and link portions provided between the keys and the base end portion. The link portions each include a plurality of (two or three) arms each extending a predetermined length in the front-rear direction, and each arm has a front end and a rear end thereof integrally formed with a rear end of an associated one of the keys and a front end of the base end portion in a state in which the front end and the rear end of the arm are connected to the rear end of the associated one of the keys and the front end of the base end portion, respectively. Further, each link portion is set such that a location of each arm thereof is different depending on whether the key associated therewith is a white key or a black key. That is, the link portions are configured to be different from each other depending on whether the key associated with each link portion is a white key or a black key. In short, the link portions are configured to be different between white key-associated link portions and black key-associated link portions. Normally, black keys are shorter in length than white keys, and in view of this, the white key-associated link portions and the black key-associated link portions are made different in configuration from each other in order to cause key depression operations of black keys and key depression operations of white keys to be aligned with each other.

In the above-described keyboard device, the front-side connecting link bar and the rear-side connecting link bar of the linkage that supports an associated key are each formed by a metal plate. Therefore, when the connecting link bars are connected to each other or they are connected to the key, respectively, it is necessary to fix the two connecting link bars to each other by inserting a connection pin into respective pin holes of connection portions of the link bars in a state in which the pin holes are aligned in a left-right direction. When the front-side connecting link bar, the rear-side connecting link bar, and the key are connected to each other as described above, the connecting work is very troublesome, and this increases time and labor for assembling the keyboard device. Further, in a case where it is required to disassemble one of the keys and an associated one of the linkages from each other e.g. when performing maintenance of the keyboard device, it is necessary to remove the fixed connection pin. This disassembling work as well is very troublesome. Further, center lines of these components extending in the longitudinal direction are displaced in the left-right direction, as viewed in plan view. As a result, upon key depression, a component force of a downward depression force transmitted from the key to the linkage sometimes acts on the connecting link bars and the connection pin from sideward. Further, if the key is depressed repeatedly, the linkage is sometimes hindered from sufficiently receiving depression force from the key. Thus, the keyboard device described above has room for improvement.

As the linkage, Japanese Laid-Open Patent Publication (Kokai) No. 2020-52391 discloses only one for a white key, whereas Japanese Laid-Open Patent Publication (Kokai) No. 2010-286694 discloses a configuration in which a linkage for a white key and a linkage for a black key are made different from each other. Therefore, for example, by constructing the linkage as disclosed in Japanese Laid-Open Patent Publication (Kokai) No. 2020-52391 as a linkage dedicated to a white key and a linkage dedicated to a black key, as disclosed in Japanese Laid-Open Patent Publication (Kokai) No. 2010-286694, it is possible to align the key depression operation of a black key shorter than a white key and the key depression operation of the white key.

However, in a case the linkages are manufactured as ones dedicated to white keys and ones dedicated to black keys, respectively, the plurality of link bars as well are required to be made different between the white key-associated link bars and the black key-associated link bars, which increases manufacturing costs.

SUMMARY OF THE INVENTION

It is a first object of the present invention to provide a keyboard device for a keyboard instrument, which is capable of simplifying a connection structure for connecting keys and key support mechanisms, and consequently capable of not only efficiently assembling the whole keyboard device but also easily performing maintenance of the keyboard device.

It is a second object of the present invention to provide a keyboard device for a keyboard instrument, which is capable of stably and securely receiving forces for depressing the keys by the key support mechanisms, thereby improving rigidity and durability of the whole keyboard device.

It is a third object of the present invention to provide a keyboard device for a keyboard instrument, which is capable of simplifying the connection structure for connecting keys and key support mechanisms and easily mounting the keys and the key support mechanisms on a keyboard chassis, consequently capable of efficiently assembling the whole keyboard device.

It is a fourth object of the present invention to provide a keyboard device for a keyboard instrument, which is capable of suppressing increase in manufacturing costs while ensuring mutual alignment of key depression operations for depressing white keys and black keys.

To attain the above first object, in a first aspect of the present invention, there is provided a keyboard device for a keyboard instrument, including a keyboard chassis, a plurality of keys provided on the keyboard chassis and each extending a predetermined length in a front-rear direction, the keys being arranged in a state arranged side by side in a left-right direction, and a plurality of key support mechanisms each provided in a state engaged with the keyboard chassis and arranged side by side in the left-right direction, each for supporting an associated one of the keys from below, wherein the key support mechanisms each include an arm configured to extend in the front-rear direction and swingably engaged with a pivot shaft provided on the keyboard chassis, the arm being pivotally connected to a key-side connecting portion formed on a predetermined portion of an associated one of the keys via an arm-side connecting portion formed on an end of the arm, wherein the key-side connecting portion includes a plate-like connecting body portion hanging downward from the key and having a predetermined thickness in the left-right direction, and a pair of engagement protrusions coaxially protruding to the left and the right from the connecting body portion, respectively, wherein the arm-side connecting portion includes two connecting arm portions formed in a bifurcated shape extending a predetermined length along a longitudinal direction of the arm, the connecting arm portions being capable of sandwiching the connecting body portion from the left and the right, and fitting portions provided on the respective connecting arm portions and having associated ones of the engagement protrusions pivotally fitted therein.

With the construction of the first aspect of the present invention, the plurality of keys each extending the predetermined length in the front-rear direction are arranged on the keyboard chassis in the state arranged side by side in the left-right direction. Further, on the keyboard chassis, the plurality of key support mechanisms engaged therewith are mounted in the state arranged side by side in the left-right direction. Each key support mechanism is configured to support an associated one of the keys from below. The key support mechanism includes the arm which extends in the front-rear direction. The arm is swingably engaged with the pivot shaft of the keyboard chassis, and is pivotally connected to the key-side connecting portion formed via the arm-side connecting portion formed on the end of the arm.

Further, with the above-described construction, to connect the key and the associated arm, the connecting body portion of the key-side connecting portion is inserted between the two connecting arm portions of the arm-side connecting portion, whereby the pair of engagement protrusions of the connecting body portion are fitted in the respective fitting portions of the two connecting arm portions. By thus assembling the key and the arm such that the key-side connecting body portion is inserted between the two connecting arm portions of the arm-side connecting portion, it is possible to easily perform an operation for connecting the key and the arm. Further, e.g. for maintenance of the keyboard device, when the key and the arm are disconnected from each other, the key-side engagement protrusions and the arm-side fitting portions are disengaged from each other by increasing a spacing between tip ends of the two connecting arm portions of the arm. As described above, compared with the conventional, keyboard device, it is possible to simplify the connection structure for connecting the key and the arm, and consequently it is possible not only to of assemble the whole keyboard device but also to easily perform maintenance of the keyboard device.

Preferably, the two connecting arm portions are formed to bend, when engaged with and disengaged from the connecting body portion and the pair of engagement protrusions, such that a distance between tip ends of the two connecting arm portions is increased so as to allow the engagement with and disengagement from the connecting body portion and the pair of engagement protrusions.

With the construction of this preferred embodiment, during the above-mentioned engagement and disengagement, the two connecting arm portions of the arm-side connecting portion bend such that the spacing between the tip ends thereof is increased, and hence it is possible to easily connect and disconnect between the key and the arm without damaging the two connecting arm portions.

More preferably, the key-side connecting portion is formed on a rear portion of the key, and the rear portion of the key is provided with a tool insertion hole which vertically extends through the rear portion, for inserting a predetermined tool from above between the two connecting arm portions when the two connecting arm portions are disengaged from the connecting body portion and the pair of engagement protrusions.

With the construction of this preferred embodiment, since the rear portion of the key is provided with the tool insertion hole, when the key and the arm are disconnected from each other, the predetermined tool is inserted from above the key, between the two connecting arm portions of the arm via the tool insertion hole, to hereby increase the distance between the tip ends of the two connecting arm portions using the tool. This makes it possible to easily disconnect between the key and the arm.

More preferably, each of the two connecting arm portions includes a guide portion provided above the fitting portion, for guiding each of the pair of engagement protrusions to an associated one of the fitting portions when the key and the arm are connected.

With the construction of this preferred embodiment, each connecting arm portions is provided with the guide portion for guiding the engagement protrusion to the associated fitting portion, and hence when the key and the arm are connected, it is possible to smoothly fit the engagement protrusion in the fitting portion along the guide portion by inserting the key-side connecting body portion between the two connecting arm portions of the arm-side connecting portion.

Further preferably, each of the two connecting arm portions further includes a coming-off prevention portion which is provided above the fitting portion in a manner protruding outward in the left-right direction, for preventing the engagement protrusion from coming off from the associated fitting portion.

With the construction of this preferred embodiment, each of the two connecting arm portions has the coming-off prevention portion provided above the fitting portion, and therefore, for example, even when the rear portion of the key is hit hard by key depression to displace the rear portion of the key downward with respect to the end of the arm, left and right side walls of the key hit against the coming-off prevention portions of the two connecting arm portions, whereby it is possible to prevent the rear portion of the key from being displaced downward and consequently to prevent the arm-side engagement protrusions from coming off from the associated arm-side fitting portions.

Further preferably, the keyboard chassis is provided with key rear-side guide portions for guiding the rear portions of the keys.

With the construction of this preferred embodiment, since the rear portions of the keys are guided by the key rear-side guide portions, it is possible to ensure a smooth movement of each key while preventing lateral swing of the rear portion of the key.

To attain above second object, in a second aspect of the present invention, there is provided a keyboard device for a keyboard instrument, including a keyboard chassis, a plurality of keys provided on the keyboard chassis and each extending a predetermined length in a front-rear direction, the keys being arranged in a state arranged side by side in a left-right direction, and a plurality of key support mechanisms each provided in a state engaged with the keyboard chassis and arranged side by side in the left-right direction, each for supporting an associated one of the keys from below, the plurality of key support mechanisms each causing, upon depression of the associated one of the keys, the depressed key to operate such that the key pivotally moves about a virtual pivot located rearward of a rear end of the key, wherein the key support mechanisms each include a first arm configured to extend a predetermined length in the front-rear direction and be swingably engaged with a first pivot shaft provided on the keyboard chassis, the first arm including a first arm front-side connecting portion which is disposed forward of the first pivot shaft and is pivotally and/or slidably connected to a key front-side connecting portion provided on a front portion of the associated key, and a second arm configured to extend a predetermined length in the front-rear direction and be swingably engaged with a second pivot shaft provided on the keyboard chassis at a location rearward of the first pivot shaft, the second arm including a second arm rear-side connecting portion which is disposed rearward of the second pivot shaft and is pivotally connected to a key rear-side connecting portion provided on a rear portion of the associated key, and a second arm front-side connecting portion which is disposed forward of the second pivot shaft and is pivotally and/or slidably connected to a first arm rear-side connecting portion rearward of the first pivot shaft of the first arm, and wherein at least two of the key and the first and second arms of each key support mechanism which supports the key are arranged such that center lines of the at least two extending along their longitudinal directions coincide with each other, as viewed in plan view.

With the construction of the second aspect of the present invention, the plurality of keys each extending the predetermined length in the front-rear direction are arranged on the keyboard chassis in the state arranged side by side in the left-right direction. Further, on the keyboard chassis, the plurality of key support mechanisms engaged therewith are mounted in the state arranged side by side in the left-right direction. Each key support mechanism is configured to support an associated one of the keys from below, and cause, upon depression of the associated one of the keys, the depressed key to operate such that the key pivotally moves about the virtual pivot located rearward of the rear end of the key.

Further, each key support mechanism includes the first arm and the second arm constructed as described above. The first arm is swingably engaged with the first pivot shaft of the keyboard chassis, and the first arm front-side connecting portion disposed forward of the first pivot shaft is pivotally and/or slidably connected to the key front-side connecting portion provided on the front portion of the associated key. On the other hand, the second arm is swingably engaged with the second pivot shaft of the keyboard chassis, and the second arm rear-side connecting portion disposed rearward of the second pivot shaft is pivotally connected to the key rear-side connecting portion provided on the rear portion of the associated key. Moreover, in the second arm, the second arm front-side connecting portion disposed forward of the second pivot shaft is pivotally and/or slidably connected to the first arm rear-side connecting portion of the first arm. The front and rear portions of the key are supported from below by the key support mechanism constructed as described above, whereby when the front end of the key is pressed down by key depression, the rear end of the key is moved downward in a manner interlocked with the pressing down of the front end of the key while maintaining a constant relationship with the front end of the key. That is, the depressed key moves such that the whole key pivotally moves about the virtual pivot located rearward of the rear end of the key.

Further, with the above-described construction, at least two of the key and the first and second arms of the key support mechanism that supports the key are arranged such that the center lines thereof extending along their longitudinal directions coincide with each other, as viewed in plan view. With this, compared with e.g. a case where the center lines of the respective key, first arm, and second arm are displaced from each other, as viewed in plan view, it is possible, when the key is depressed, to stably and securely receive a force for depressing the key by the key support mechanism, whereby it is possible to improve rigidity and durability of the whole keyboard device.

Note that in the present invention, it is preferable that the key, the first arm, and the second arm are arranged such that the center lines thereof coincide with with each other, as viewed in plan view. In this case, it is possible to appropriately transmit the force for depressing the key to first and second arms of the key support mechanism from immediately above the first and second arms, whereby is possible to more effectively obtain the above-described advantageous effects.

Preferably, one of the key front-side connecting portion and the first arm front-side connecting portion includes a first connecting shaft extending in the left-right direction, and the other of the key front-side connecting portion and the first arm front-side connecting portion includes a first connecting recess formed to have a slot-like shape in side view with one end thereof open or have a slot-like shape in side view, for engagement with the first connecting shaft.

With the construction of this preferred embodiment, e.g. during assembly of the keyboard device, to connect the key and the first arm, the key and the first arm are assembled to each other by inserting the first connecting shaft of the one of the key front-side connecting portion and the first arm front-side connecting portion in the first connecting recess of the other of the key front-side connecting portion and the first arm front-side connecting portion via the open end or the slot. By thus simply inserting the first connecting shaft in the first connecting recess, it is possible to easily perform an operation for connecting the key and the first arm.

Preferably, one of the key rear-side connecting portion and the second arm rear-side connecting portion includes a plate-like connecting body portion having a predetermined thickness in the left-right direction, and a pair of engagement protrusions coaxially protruding to the left and the right from the connecting body portion, respectively, and the other of the key rear-side connecting portion and the second arm rear-side connecting portion includes two connecting arm portions formed into a bifurcated shape and configured to be capable of sandwiching the connecting body portion from the left and the right, and fitting portions provided in the respective connecting arm portions, for having associated ones of the engagement protrusions pivotally fitted therein.

With the construction of this preferred embodiment, e.g. during assembly of the keyboard device, to connect the key and the second arm, the connecting body portion provided on the one of the key rear-side connecting portion and the second arm rear-side connecting portion is inserted between the two connecting arm portions provided on the other of the key rear-side connecting portion and the second arm rear-side connecting portion, and the pair of engagement protrusions of the connecting body portion are fitted in the respective fitting portions of the two connecting arm portions. As described above, the key and the second arm are assembled by inserting the connecting body portion between the two connecting arm portions, whereby it is possible to easily perform an operation for connecting the key and the second arm.

More preferably, one of the first arm rear-side connecting portion and the second arm front-side connecting portion includes a second connection shaft extending in the left-right direction, and the other of the first arm rear-side connecting portion and the second arm front-side connecting portion includes a second connecting recess formed to have a slot-like shape in side view with one end thereof open or have a slot-like shape in side view, for engagement with the second connecting shaft.

With the construction of this preferred embodiment, e.g. during assembly of the keyboard device, to connect the first arm and the second arm, the first arm and the second arm are assembled to each other by inserting the second connection shaft of the one of the first arm rear-side connecting portion and the second arm front-side connecting portion in the second connecting recess of the other of the first arm rear-side connecting portion and the second arm front-side connecting portion via the open end or the slot. As described above, by thus simply inserting the second connecting shaft in the second connecting recess, it is possible to easily perform an operation for connecting the first arm and the second arm.

Preferably, a weight for adding a touch weight to the key is provided at a predetermined location of one of the first arm and the second arm.

With the construction of this preferred embodiment, since the weight is provided at the predetermined location of the one of the first arm and the second arm, it is possible for a player who depresses the key to feel an appropriate weight at his/her fingertip, whereby it is possible to obtain a touch weight similar to a case where the player performs key depression on a keyboard of an acoustic piano.

More preferably, the keyboard chassis is provided with key switches each for detecting, upon key depression, key depression information of a depressed key by being pressed by one of the first arm and the second arm in accordance with key depression.

With the construction of this preferred embodiment, upon key depression, the first arm and the second arm of a key support mechanism associated with the depressed key swing, and a key switch is pressed by one of the arms, whereby the key depression information of the depressed key is detected. This makes it possible to produce a piano tone corresponding to the depressed key based on the detected key depression information.

To attain the above third object, in a third aspect of the present invention, there is provided a keyboard device for a keyboard instrument, including a keyboard chassis, a plurality of keys provided on the keyboard chassis and each extending a predetermined length in a front-rear direction, the keys being arranged in a state arranged side by side in a left-right direction, and a plurality of key support mechanisms each provided in a state engaged with the keyboard chassis and arranged side by side in the left-right direction, each for supporting an associated one of the keys from below, the plurality of key support mechanisms each causing, upon depression of the associated one of the keys, the depressed key to operate such that the key pivotally moves about a virtual pivot located rearward of a rear end of the key, wherein the key support mechanisms each include a first arm configured to extend a predetermined length in the front-rear direction and be swingably engaged with a first pivot shaft provided on the keyboard chassis, the first arm including a first arm front-side connecting portion which is disposed forward of the first pivot shaft and is pivotally and/or slidably connected to a key front-side connecting portion provided on a front portion of the associated key, and a second arm configured to extend a predetermined length in the front-rear direction and be swingably engaged with a second pivot shaft provided on the keyboard chassis at a location rearward of and higher than the first pivot shaft, the second arm including a second arm rear-side connecting portion which is disposed rearward of the second pivot shaft and is pivotally connected to a key rear-side connecting portion provided on a rear portion of the associated key, and a second arm front-side connecting portion which is disposed forward of the second pivot shaft and is pivotally and/or slidably connected to a first arm rear-side connecting portion rearward of the first pivot shaft of the first arm, and wherein the keyboard chassis is provided with an arm assembling opening open at least either upward or forward, for assembling the first arm and the second arm to the keyboard chassis.

With the construction of the third aspect of the present invention, the plurality of keys each extending the predetermined length in the front-rear direction are arranged on the keyboard chassis in the state arranged side by side in the left-right direction. Further, on keyboard chassis, the plurality of key support mechanisms engaged with the keyboard chassis are provided in the state arranged side by side in the left-right direction. Each key support mechanism is configured to support an associated one of the keys from below, and cause, upon key depression, the depressed key to operate such that the key pivotally moves about the virtual pivot located rearward of the rear end of the key.

Further, each key support mechanism includes the first arm and the second arm constructed as described above. The first arm is swingably engaged with the first pivot shaft of the keyboard chassis, and the first arm front-side connecting portion disposed forward of the first pivot shaft is pivotally and slidably connected to the key front-side connecting portion provided on the front portion of the associated key. On the other hand, the second arm is swingably engaged with the second pivot shaft of the keyboard chassis, and the second arm rear-side connecting portion disposed rearward of the second pivot shaft is pivotally connected to the key rear-side connecting portion provided on the rear portion of the associated key. Moreover, in the second arm, the second arm front-side connecting portion disposed forward of the second pivot shaft is pivotally and slidably connected to the first arm rear-side connecting portion of the first arm. The front and rear portions of the key are supported from below by the key support mechanism constructed as described above, whereby when the front end of the key is pressed down by key depression, the rear end of the key is moved downward in a manner interlocked with the pressing down of the front end of the key, while maintaining a constant relationship with the front end of the key. That is, the depressed key moves such that the whole key pivotally moves about the virtual pivot located rearward of the rear end of the key.

Further, with the above-described construction, the keyboard chassis is provided with the arm assembling opening open at least either upward or forward. With this, when the first arm and the second arm assembled to the keyboard chassis, the first arm and the second arm can be easily assembled to the keyboard chassis via the arm assembling opening from above or the front side of the keyboard chassis. As a result, it is possible to efficiently assemble the keyboard device.

Preferably, the keyboard chassis includes a plurality of chassis bodies each formed as a resin molded article and connected to each other in the left-right direction, and each chassis body includes the first pivot shaft and the second pivot shaft, and at least one of a key front-side guide portion for guiding a front end of the key, a key rear-side guide portion for guiding a rear end of the key, a key upper limit stopper portion for restricting an upper limit position of the front end of the key, a key lower limit stopper portion for restricting a lower limit position of the front end of the key, a first arm upper limit stopper portion for restricting an upper limit position of a rear end of the first arm, a first arm lower limit stopper portion for restricting a lower limit position of the rear end of the first arm, a first arm side surface guide portion for guiding a side surface of the first arm, and a second arm side surface guide portion for guiding a side surface of the second arm, wherein the first pivot shaft and the second pivot shaft, and at least one of the key front-side guide portion, the key rear-side guide portion, the key upper limit stopper portion, the key lower limit stopper portion, the first arm upper limit stopper portion, the first arm lower limit stopper portion, the first arm side surface guide portion, and the second arm side surface guide portion are integrally formed with each other via a plurality of ribs extending in the front-rear direction and arranged with a spacing therebetween in the left-right direction.

With the construction of this preferred embodiment, the keyboard chassis is formed by connecting the plurality of chassis bodies each formed as a resin molded article to each other in the left-right direction. In each chassis body, the first pivot shaft and the second pivot shaft, and at least one of the key front-side guide portion, the key rear-side guide portion, the key upper limit stopper portion, the key lower limit stopper portion, the first arm upper limit stopper portion, the first arm lower limit stopper portion, the first arm side surface guide portion, and the second arm side surface guide portion are integrally formed with each other via the plurality of ribs. With this, when the chassis body is formed, it is possible to easily obtain not only the first pivot shaft and the second pivot shaft but also at least one of the key front-side guide portion, the key rear-side guide portion, the key upper limit stopper portion, the key lower limit stopper portion, the first arm upper limit stopper portion, the first arm lower limit stopper portion, the first arm side surface guide portion, and the second arm side surface guide portion, by one molding process.

More preferably, the first pivot shaft includes a plurality of first pivot shafts each provided between each adjacent two of the plurality of ribs, the second pivot shaft includes a plurality of second pivot shafts each provided between each adjacent two of the plurality of ribs, and at least either the plurality of first pivot shafts or the plurality of second pivot shafts are arranged on the same axis extending in the left-right direction.

With the construction of this preferred embodiment, the first pivot shaft as a swing pivot shaft of the first arm is comprised of the plurality of first pivot shafts each provided between each adjacent two of the plurality of ribs, and the second pivot shaft as a swing pivot shaft of the second arm is comprised of the plurality of second pivot shafts each provided between each adjacent two of the plurality of ribs. In this case, the plurality of first pivot shafts are arranged on the same axis extending in the left-right direction, and the plurality of second pivot shafts are arranged on the same axis other than that of the first pivot shafts, whereby in the plurality of key support mechanisms, irrespective of the types of the keys (white keys and black keys), it is possible to align all the first arms and all the second arms in the left-right direction, respectively. Further, in a case where either the plurality of first pivot shafts or the plurality of second pivot shafts are arranged on the same axis, and the others are not arranged on the same axis, it is possible to align either all the first arms or all the second arms of the plurality of key support mechanisms in the left-right direction, and align the others in the left-right direction according to the types of keys.

More preferably, predetermined ribs of the plurality of ribs are formed such that part thereof is omitted in the front-rear direction.

With the construction of this preferred embodiment, part of the predetermined ribs of the plurality of ribs is omitted in the front-rear direction, whereby it is possible to reduce the weight of the chassis body. Further, by reducing the amount of material for molding the chassis body, it is possible to reduce the manufacturing costs of the keyboard device.

More preferably, the plurality of chassis bodies have side walls formed into respective shapes complementary to each other on respective sides where two of the chassis bodies are connected to each other.

With the construction of this preferred embodiment, when the plurality of chassis bodies are connected to each other in the left-right direction, it is possible to construct the side wall by connection which is similar to the other libs without increasing the thickness thereof in the left-right direction. This makes it possible to ensure stable strength and rigidity of the keyboard chassis along the entirety thereof in the left-right direction.

To attain the above fourth object, in a fourth aspect of the present invention, there is provided a keyboard device for a keyboard instrument, including a keyboard chassis, a plurality of keys provided on the keyboard chassis and each extending a predetermined length in a front-rear direction, the keys being arranged in a state arranged side by side in a left-right direction and including white keys and black keys, and a plurality of key support mechanisms for the white keys and the black keys, each provided in a state engaged with the keyboard chassis and arranged side by side in the left-right direction, each for supporting an associated one of the keys from below, the plurality of key support mechanisms each causing, upon depression of the associated one of the keys, the depressed key to operate such that the key pivotally moves about a virtual pivot located rearward of a rear end of the key, wherein the key support mechanisms each include a first arm configured to extend a predetermined length in the front-rear direction and be swingably engaged with a first pivot shaft provided on the keyboard chassis, the first arm including a first arm front-side connecting portion which is disposed forward of the first pivot shaft and is pivotally and/or slidably connected to a key front-side connecting portion provided on a front portion of the associated key, and a second arm configured to extend a predetermined length in the front-rear direction and be swingably engaged with a second pivot shaft provided on the keyboard chassis at a location rearward of the first pivot shaft, the second arm including a second arm rear-side connecting portion which is disposed rearward of the second pivot shaft and is pivotally connected to a key rear-side connecting portion provided on a rear portion of the associated key, and a second arm front-side connecting portion which is disposed forward of the second pivot shaft and is pivotally and/or slidably connected to a first arm rear-side connecting portion rearward of the first pivot shaft of the first arm, and wherein in the key support mechanisms for the white keys and the black keys, at least either the first arms or the second arms are constructed similar to each other in shape and size.

With the construction of the fourth aspect of the present invention, the plurality of keys, which include the white keys and the black keys and each extend the predetermined length in the front-rear direction, are arranged on the keyboard chassis in the state arranged side by side in the left-right direction. Further, on the keyboard chassis, the plurality of key support mechanisms for the white keys and the black keys, each engaged with the keyboard chassis, are provided in the state arranged side by side in the left-right direction. Each key support mechanism is configured to support an associated one of the keys from below, and cause, upon key depression, the depressed key to operate such that the key pivotally moves about the virtual pivot located rearward of the rear end of the key.

Further, each key support mechanism includes the first arm and the second arm constructed as described above. The first arm is swingably engaged with the first pivot shaft of the keyboard chassis. The first arm front-side connecting portion disposed forward of the first pivot shaft is pivotally and slidably connected to the key front-side connecting portion provided on the front portion of the associated key. On the other hand, the second arm is swingably engaged with the second pivot shaft of the keyboard chassis, and the second arm rear-side connecting portion disposed rearward of the second pivot shaft is pivotally connected to the key rear-side connecting portion provided on the rear portion of the associated key. Moreover, in the second arm, the second arm front side connecting portion disposed forward of the second pivot shaft is pivotally and slidably connected to the first arm rear-side connecting portion of the first arm. The front and rear portions of the key are supported from below by the key support mechanism constructed as described above, whereby when the front end of the key is pressed down key depression, the rear end of the key is moved downward in a manner interlocked with the pressing down of the front end of the key while maintaining a constant relationship with the front end of the key. That is, each of the depressed white kay and black key moves such that the whole key pivotally moves about the virtual pivot located rearward of the rear end of the key.

Further, with the above-described construction, in the key support mechanisms for the white keys and the black keys, at least either the first arms or the second arms are constructed similar to each other in shape and size, and hence it is possible to commonalize at least either the first arms or the second arms in the key support mechanisms for the white keys and the black keys. With this, e.g. in a case where each arm is formed as a resin molded article, it is possible to suppress increase in the types of molds for manufacturing the arms, and suppress increase in the manufacturing costs of the keyboard device as a whole.

Preferably, the black keys are disposed such that front ends thereof are located rearward of front ends of the white keys, and the key front-side connecting portion is provided, in a case where the key is a black key, in the vicinity of a front end of the key in the longitudinal direction of the key, and in a case where the key is a white key, at a location corresponding to the vicinity of a front end of the black key.

With the construction of this preferred embodiment, the key front-side connecting portion is provided, in a case where the key is a black key, in the vicinity of the front end of the key in the longitudinal direction of the key, whereas in a case where the key is a white key, at the location corresponding to the vicinity of the front end of the black key in the longitudinal direction of the key. That is, in both of the cases whether the key is a white key and the key is a black key, the key front-side connecting portion is provided at the same location, and therefore it is possible to commonalize the first arms connected to key front-side connecting portions irrespective of the type of the key (white key or black key).

Preferably, in both of the cases where the key is a white key and the key is a black key, the key rear-side connecting portion is provided at the same location in the longitudinal direction of the key.

With the construction of this preferred embodiment, since the key rear-side connecting portion is provided at the same location in the longitudinal direction of the key in both of the cases where the key is a white key and the key is a black key, it is possible to commonalize the second arms connected to the key rear-side connecting portions irrespective of the types of the keys.

Preferably, the first arm includes an arm body extending in the front-rear direction and formed as a resin molded article, and a weight formed of a material larger in specific gravity than the arm body and mounted on a rear portion of the arm body in a manner extending rearward, and the weight to be mounted on the first arm is selected from a plurality of types of weights different in shape from each other, according to whether the key to which the first arm is connected is a white key or a black key.

With the construction of this preferred embodiment, since the first arm includes the arm body formed as a resin molded article, and the weight formed of a material larger in specific gravity than the arm body, it is possible to cause the first arm to function as a hammer for adding a touch weight to the key. Further, the weight is selected from the plurality of types of weights different in shape from each other according to the type of the key (white key or black key) to which the first arm is connected. As a result, e.g. even when the angle of pivotal motion of the first arm during depression of the key varies depending on the type of the key, it is possible, by selecting a proper weight from the plurality of weights, to easily adapt the weight to e.g. a stopper for restricting a pivotally-moved position of the first arm.

The above and other objects, features, and advantages of the present invention will become more apparent from the following detailed description taken in conjunction with the accompanying drawings.

BRIEF DESCRIPTION OF THE DRAWINGS

FIGS. 1A and 1B are perspective views of a keyboard device according to an embodiment of the present invention in a state where one white key and one black key are mounted on a keyboard chassis, in which FIG. 1A shows a state of the keyboard device as viewed from upper right and FIG. 1B shows a state of the keyboard device as viewed from upper left;

FIGS. 3A and 3B are views useful in explaining the keyboard chassis, in which FIG. 3A is a plan view of the keyboard chassis including a single chassis body as a focused component and FIG. 3B is a cross-sectional view taken along line A-A of FIG. 3A;

FIGS. 4A and 4B are perspective views of the white key and the key support mechanism therefor, in which FIG. 4A shows the white key and the key support mechanism in a connected state and FIG. 4B shows the white key and the key support mechanism in an exploded state;

FIGS. 5A and 5B are perspective views of the black key and the key support mechanism therefor, in which FIG. 5A shows the black key and the key support mechanism in a connected state and FIG. 5B shows the black key and the key support mechanism in an exploded state;

FIGS. 8A and 8B are views useful in explaining operation of the white key in the keyboard device, in which FIG. 8A shows a key-released state and FIG. 8B shows a key-depressed state; and FIGS. 9A and 9B are views useful in explaining operation of the black key in the keyboard device, in which FIG. 9A shows a key-released state and FIG. 9B shows a key-depressed state.

DETAILED DESCRIPTION OF PREFERRED EMBODIMENTS

Figure 1A:
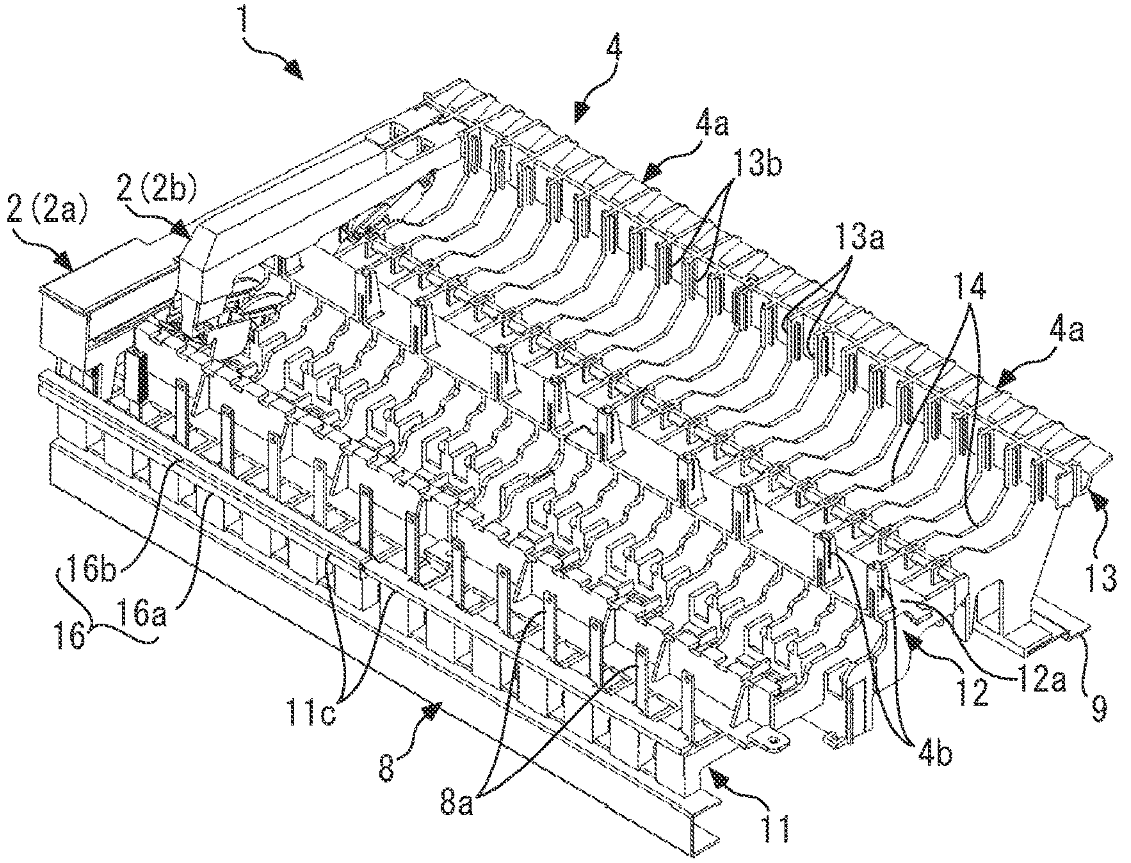
Figure 1B:
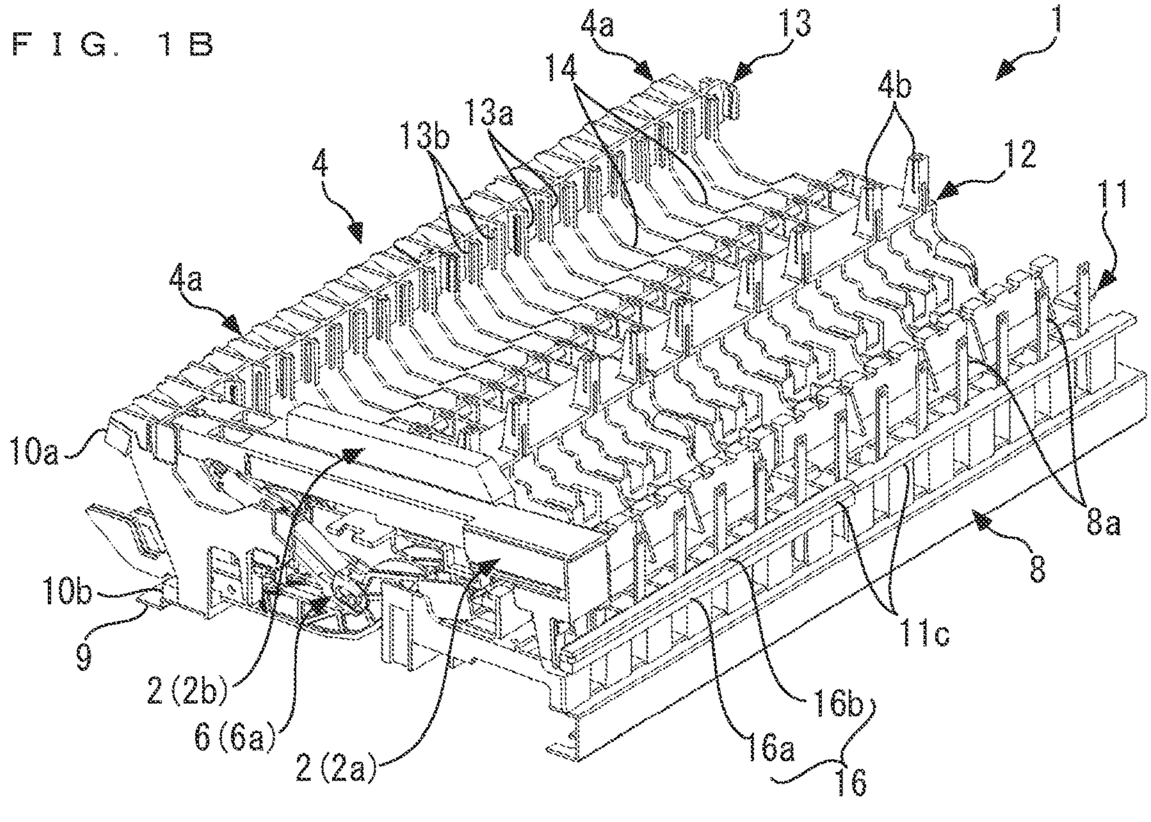

The present invention will now be described in detail with reference to the drawings showing preferred embodiments thereof. FIGS. 1A and 1B are perspective views of a keyboard device 1 for an electronic piano, to which the present invention is applied, in a state where one white key 2*a* and one black key 2*b* are mounted on a keyboard chassis 4. FIG. 1A shows a state of the keyboard device 1 as viewed from upper right, and FIG. 1B shows a state of the keyboard device 1 as viewed from upper left. Further, FIG. 2 shows the keyboard device 1 shown in FIGS. 1A and 1B in a state in which the white key 2*a* and the black key 2*b* are removed from the keyboard chassis 4 together with a key support mechanism 6*a* for a white key and a key support mechanism 6*b* for a black key which support the white key 2*a* and the black key 2*b* from below, respectively.

Figure 2:
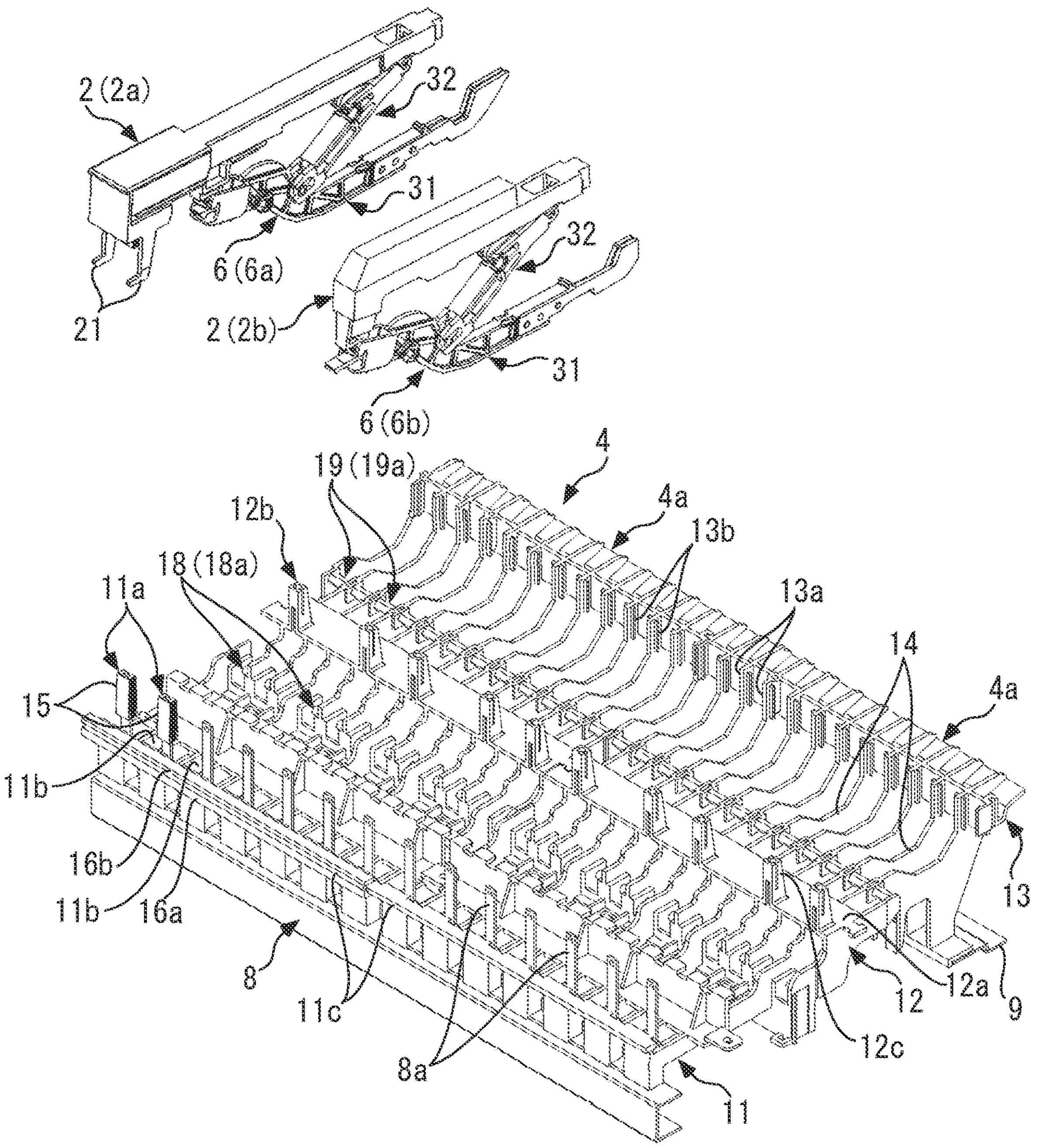
FIG. 2 is a perspective view of the keyboard device shown in FIGS. 1A and 1B in a state in which the white key and the black key are removed from the keyboard chassis together with respective key support mechanisms therefor.

Note that FIGS. 1A to 2 show a portion of the keyboard chassis 4 of the keyboard device 1, specifically, two chassis bodies 4*a* and 4*a* of the keyboard chassis 4, each corresponding to one octave, in a state connected to each other in a left-right direction. Further, on a front end and a rear end of a lower surface of the keyboard chassis 4, there are mounted a front rail 8 and a rear rail 9, each made of metal and ex ending in the left-right direction, respectively. The keyboard chassis 4 is fixed to a keybed, not shown, of the electronic piano via the rails 8 and 9.

Further, in the following description, if the white key 2*a* and the black key 2*b* are not particularly distinguished from each other, they will be simply referred to as "the keys 2", and if the white key-associated key support mechanism 6*a* and the black key-associated key support mechanism 6*b* are not particularly distinguished from each other, they will be simply referred to as "the key support mechanisms 6".

Figure 3A:
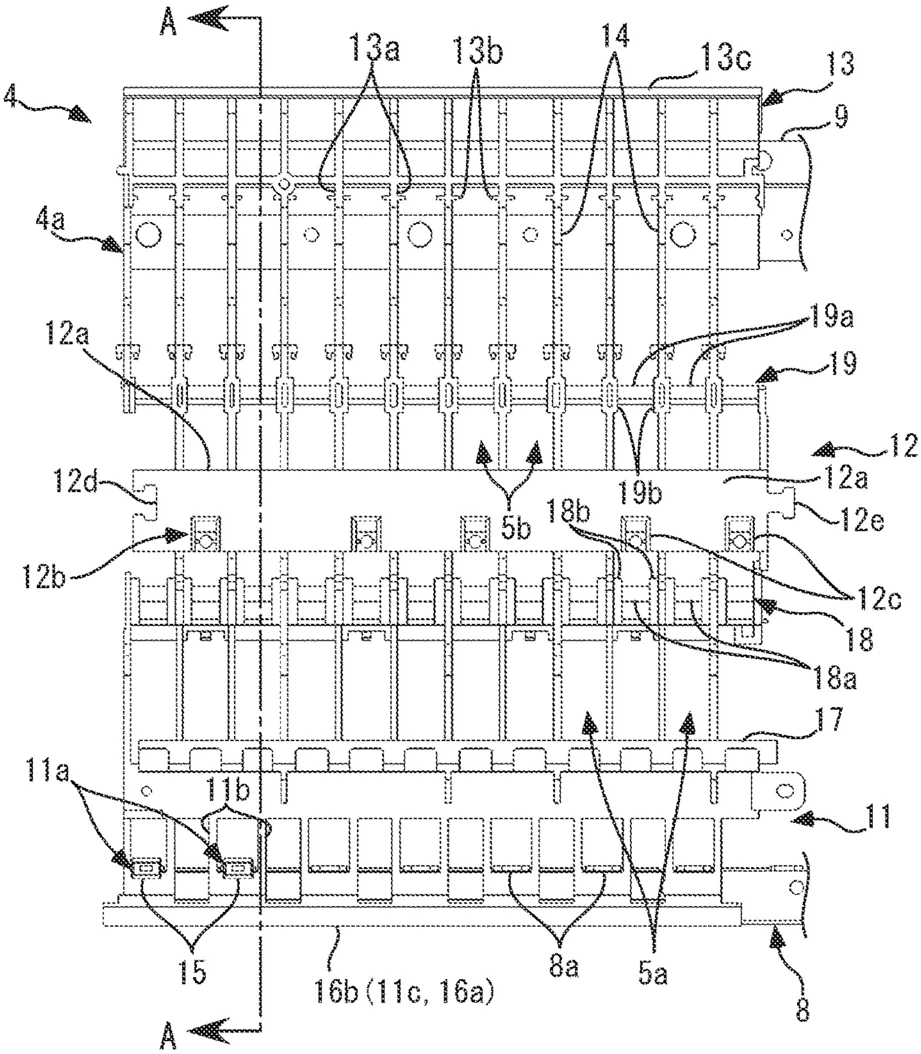
Figure 3B:
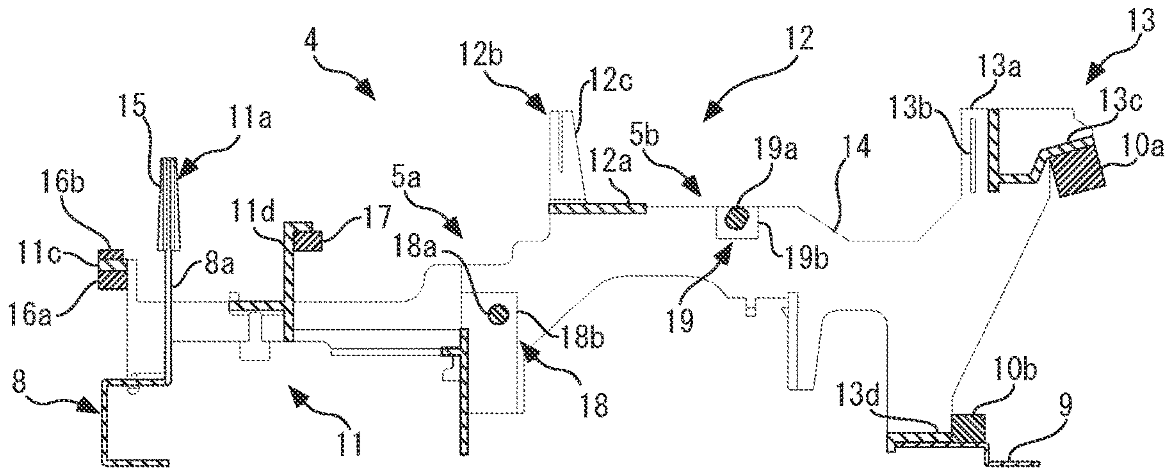

FIGS. 3A and 3B partially show the keyboard chassis 4 including a single chassis body 4*a* as a focused component, in which FIG. 3A is a plan view of the keyboard chassis 4, and FIG. 3B is a cross-sectional view taken along line A-A of FIG. 3A. The chassis body 4*a* of the keyboard chassis 4 is formed as a resin molded article which is made e.g. by injection molding of a predetermined resin material (e.g. an ABS resin) into a predetermined shape. As shown in FIGS. 3A and 3B, the chassis body 4*a* has a front portion 11, an intermediate portion 12, and a rear portion 13, each extending in the left-right direction (in a left-right direction as viewed in FIG. 3A) as a whole. The front portion 11, the intermediate portion 12, and the rear portion 13 are integrally formed with each other by a plurality of ribs 14 disposed with a spacing therebetween in the left-right direction and each extending in the front-rear direction. Note that in the following description, the front portion 11, the intermediate portion 12, and the rear portion 13 of the chassis body 4*a* of the keyboard chassis 4 will be referred to as "the chassis front 11", "the chassis intermediate 12", and "the chassis rear 13", respectively.

The chassis front 11 is mainly for guiding the white key 2*a* during depression thereof and restricting the upper limit position and the lower limit position of a front end of the white key 2*a*. On the chassis front 11, there are erected a plurality of white key guides 11*a*, each of which is inserted into each associated one of the white keys 2*a* from below so as to prevent lateral swing of the white key 2*a*, in a state arranged side by side in the left-right direction. Note that the white key guides 11*a* are formed by mounting resin guide bodies 15 (only two of which are shown in FIGS. 2 and 3A) having a predetermined shape on respective upper portions of a plurality of erected pieces 8*a* which are integrally formed with the above-mentioned front rail 8 by bending a metal plate having a predetermined shape.

Further, the chassis front 11 has engagement holes 11*b* and 11*b*, vertically extending therethrough, which are formed on the left and right sides of each of the white key guides 11*a*, respectively. A pair of left and right upper limit position regulation portions 21 and 21, referred to hereinafter, of the white key 2*a* are engaged with the respective engagement holes 11*b* and 11*b* in a state inserted therethrough.

Furthermore, the chassis front 11 has a front end thereof formed with a stopper-mounting portion 11*c* (a key upper limit stopper portion and a key lower limit stopper portion) that protrudes forward and extends along the entirety of the chassis body 4*a* in the left-right direction. A key upper limit stopper 16*a* and a key lower limit stopper 16*b* for the white key are mounted on a lower surface and an upper surface of the stopper-mounting portion 11*c*, respectively, such that they extend in the left-right direction. Note that a stopper-mounting portion 11*d* (a key upper limit stopper portion) for the black key, which extends along the entirety of the chassis body 4*a* in the left-right direction, is provided at a predetermined location of the chassis front 11, rearward of each white key guide 11*a*. A key upper limit stopper 17 for the black key is mounted on the stopper-mounting portion 11*d* such that it extends in the left-right direction.

The chassis intermediate 12 is mainly for guiding the black key 2*b* during depression thereof and swingably supporting a first arm 31 and a second arm 32 (arm), described hereinafter, of each of the white key-associated key support mechanism 6*a* and the black key-associated key support mechanism 6*b*. The chassis intermediate 12 has a flat portion. 12*a* in the form of a flat plate extending in the left-right direction, and a plurality of black key guides 12*b* erected on the flat portion 12*a* and disposed with an appropriate spacing therebetween in the left-right direction. Each black key guide 12*b* is inserted into an associated one of the black keys 2*b* from below to prevent lateral swing of the black key 2*b*. Note that the black key guides 12*b* are formed by mounting resin guide bodies (not shown) having a predetermined width on respective erected portions 12*c* (key front-side guide portions) integrally formed with the chassis body 4*a*.

Further, the chassis intermediate 12 has a front portion thereof provided with a first arm support portion 18 for supporting the first arms 31 of the key support mechanisms 6. The first arm support portion 18 has a plurality of first pivot shafts 18*a* each of which is provided between each adjacent two of the ribs 14 and 14 such chat the first pivot shaft 18*a* extends in the left-right direction, and side surface guide portions 18*b* and 18*b* (first arm side surface guide portions) which are provided on the respective opposite ends of each first pivot shaft 18*a*. The plurality of first pivot shafts 18*a* are arranged on the same axis extending in the left-right direction, and the first arms 31 are swingably supported on associated ones of the first pivot shafts 18*a*. Further, the side surface guide portions 18*b* and 18*b* provided on the respective opposite ends of each first pivot shaft 18*a* are integrally formed with associated ones of the ribs 14 in a state protruding coward the first pivot shaft 18*a*. A distance between each two of the side surface guide portions 18*b* and 18*b* is set to approximately the same dimension as a lateral width of a bearing portion 36, referred to hereinafter, of each first arm 31. With this, when the first arm 31 swings about an associated one of the first pivot shafts 18*a*, lateral swing of the first arm 31 is prevented while the left and right side surfaces of the first arm 31 are held in sliding contact with the two side surface guide portions 18*b* and 18*b*.

Further, the chassis intermediate 12 has a rear portion thereof provided with a second arm support portion 19 for supporting the second arms 32 of the key support mechanisms 6. The second arm support portion 19 has a plurality of second pivot shafts 19*a* each of which is provided between each adjacent two of the ribs 14 and 14 such that the second pivot shaft 19*a* extends in the left-right direction, and side surface guide portions 19*b* and 19*b* (second arm side surface guide portions) which are provided on the respective opposite ends of each second pivot shaft 19*a*. The plurality of second pivot shafts 19*a* are arranged on the same axis extending in the left-right direction at a location rearward of and higher than the first pivot shafts 18*a*, and the second arms 32 are swingably supported on associated ones of the second pivot shafts 19*a*. Further, the side surface guide portions 19*b* and 19*b* provided on the respective opposite ends of each second pivot shaft 19*a* are integrally formed with associated ones of the ribs 14 in a state protruding toward the second pivot shaft 19*a*. A distance between each two of the side surface guide portions 19*b* and 19*b* is set to approximately the same dimension as a lateral width of a bearing 41, referred to hereinafter, of each second arm 32. With this, when the second arm 32 swings about an associated one of the second pivot shafts 19*a*, lateral swing of the second arm 32 is prevented while the left and right side surfaces of the second arm 32 is held in sliding contact with the two side surface guide portions 19*b* and 19*b*.

As described above, the plurality of first pivot shafts 18*a*, with which the first arms 31 of the key support mechanisms 6 are engaged, are arranged on the same axis, and similarly, the plurality of second pivot shafts 19*a* as well, with which the second arms 32 are engaged, are arranged on the same axis, so that it is possible to uniformly align all the first arms 31 and all the second arms 32 of the plurality of key support-mechanisms 6 of the keyboard device 1 in the left-right direction.

Note that, although omitted from illustration, it is also possible to arrange either the first pivot shafts 18*a* or the second pivot shafts 19*a* on the same axis, and arrange the others of the first and second pivot shafts 18*a* and 19*a* on the same axis different from the above-mentioned same axis, according to the types of associated ones of the keys 2 (the white keys 2*a* and the black keys 2*b*). In this case, it is possible to uniformly align either all the first arms 31 or all the second arms 32 of the plurality of key support mechanisms 6 in the left-right direction, and uniformly align the others of the first and second arms 31 and 32 in the left-right direction, according to the types of the keys 2.

Further, although not shown, key switches for each detecting key depression information of an associated one of the keys 2 are provided on a lower portion of the keyboard chassis 4 between the chassis front 11 and the chassis intermediate 12. The key switches are formed by a laterally elongated printed circuit board ex ending in the left-right direction, and switch bodies formed by rubber switches attached to the printed circuit board on a key-by-key basis, for being pressed by associated ones of the first arms 31 upon key depression.

The chassis rear 13 is mainly for guiding the keys 2 by their rear ends in the vertical direction while preventing lateral swing of the keys 2 and for restricting the upper limit positions and the lower limit positions of the rear ends of associated ones of the first arms 31. As shown in FIGS. 3A and 3B, the chassis rear 13 has a plurality of partition walls 13*a* formed with a predetermined spacing therebetween in the left-right direction so as to separate each adjacent two of the keys 2 and 2 from each other. Further, key guide protrusions 13*b* and 13*b* (key rear-side guide portions) which extend vertically and protrude inward are provided on the respective mutually opposed side surfaces of each adjacent two of the partition walls 13*a* and 13*a*. A distance between each two of the key guide protrusions 13*b* and 13*b* is set to approximately the same dimension as a lateral width of a rear end of the key 2. With this, the key 2, upon being depressed, is smoothly guided in the vertical direction while lateral swing of the rear end thereof is being prevented.

Further, as shown in FIG. 3B, stopper-mounting portions 13*c* and 13*d* (a first arm upper limit stopper portion and a first arm lower limit stopper portion) extending along the entirety of the chassis body 4*a* in the left-right direction are provided at respective predetermined locations of upper and lower portions of the chassis rear 13. The upper and lower stopper-mounting portions 13*c* and 13*d* are provided with a first arm upper limit stopper 10*a* and a first arm lower limit stopper 10*b*, respectively. The first arm upper limit stopper 10*a* and the first arm lower limit stopper 10*b* are for restricting the upper limit position and the lower limit position of a rear end of the first arm 31 having a function as a hammer for adding a touch weight to the key 2. Further, the two stoppers 10*a* and 10*b*, formed e.g. of foamed urethane, each have a rectangular shape in transverse cross-section and are formed such that they extend along the entirety of the chassis body 4*a* in the left-right direction.

Further, as shown in FIG. 3A, in the chassis body 4*a*, the ribs 14 and 14 corresponding to side walls on the left and right opposite ends of the chassis body 4*a* are formed into shapes complementary to each other such that when two of the chassis bodies 4*a* are connected to each other in the left-right direction, the ribs 14 and 14 are made continuous in the front-rear direction. Specifically, the rib 14 on the left end of the chassis body 4*a* is formed in a state where a portion thereof associated with the chassis intermediate 12 is omitted, whereas the rib 14 on the right end of the chassis body 4*a* is formed in a state where portions thereof associated with the chassis front 11 and the chassis rear 13 are omitted. Therefore, by connecting the two chassis bodies 4*a* in the left-right direction in a state adjacent to each other, it is possible to construct the side wall by connection which is similar to the other libs 14 without increasing the thickness thereof in the left-right direction. With this, it is possible to ensure stable strength and rigidity of the keyboard chassis 4 along the entirety thereof in the left-right direction.

Note that as shown in FIG. 3A, an engagement recess 12*d* having a predetermined shape open leftward is formed on the left end of the flat portion 12*a* of the chassis intermediate 12, and on the right end of the flat portion 12*a*, there is formed an engagement protrusion 12*e* having a predetermined shape protruding rightward in association with the above-mentioned engagement recess 12*d*. Therefore, to connect the two chassis bodies 4*a* to each other, by fitting the engagement protrusion 12*e* of one chassis body 4*a* in the engagement recess 12*d* of the other chassis body 4*a*, it is possible to easily position the two chassis bodies 4*a* and 4*a* when connecting them.

As shown in FIGS. 3A and 3E, the chassis body 4*a* of the keyboard chassis 4 constructed as described above is formed with first openings 5*a* (arm assembling openings) open upward and forward and second openings 5*b* (arm assembling openings) open upward. The first arms 31 of the key support mechanisms 6 can be easily fitted in associated ones of the first pivot shafts 18*a* from outside via the above-mentioned first openings 5*a*, respectively. Further, the second arms 32 can be easily fitted in associated ones of the second pivot shafts 19*a* from outside via the above-mentioned second openings 5*b*, respectively. As described above, it is possible to easily mount the first arms 31 and the second arms 32 of the key support mechanisms 6 on the keyboard chassis 4, and consequently efficiently assemble the keyboard device 1.

Further, as described above, the chassis body 4*a* is integrally formed with the first pivot shafts 18*a*, the second pivot shafts 19*a*, the erected portions 12*c* for the black key guides 12*b*, the key guide protrusions 13*b*, the stopper-mounting portions 11*c*, 11*d*, 13*c* and 13*d*, the side surface guide portions 18*b* for the first-arms 31, the side surface guide portions 19*b* for the second arms 32, the libs 14, and forth. These can be easily obtained by single molding.

Further, although in the chassis body 4*a*, the plurality of libs 14 other than the libs 14 as the side walls of the left and right opposite ends of the chassis body 4*a* are all formed such that they extend from the chassis front 11 to the chassis rear 13 in the front-rear direction, predetermined libs 14 can be formed such chat part thereof is omitted. For example, the predetermined libs 14 can be omitted between the chassis front 11 and the chassis intermediate 12 as deemed appropriate. This makes it possible to reduce the weight of the chassis body 4*a* by a degree corresponding to the omission. Further, by reducing the amount of material for molding the chassis body 4*a*, it is possible to reduce the manufacturing costs of the keyboard device.

Figure 4A:
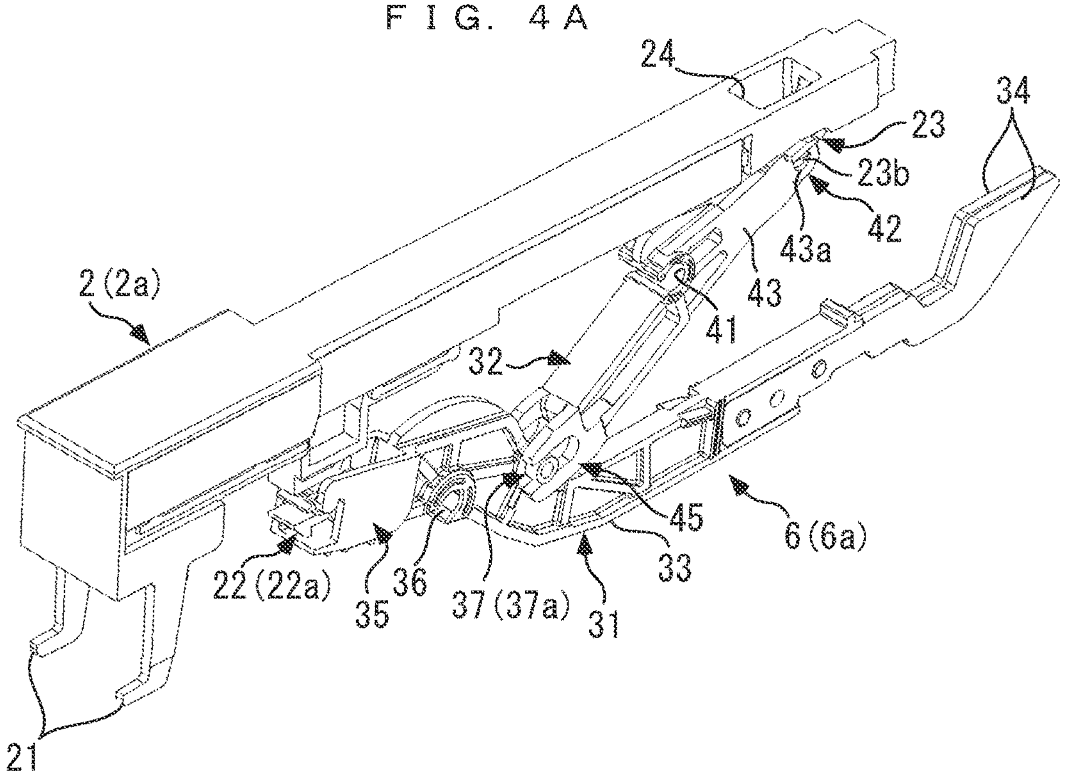
Figure 4B:
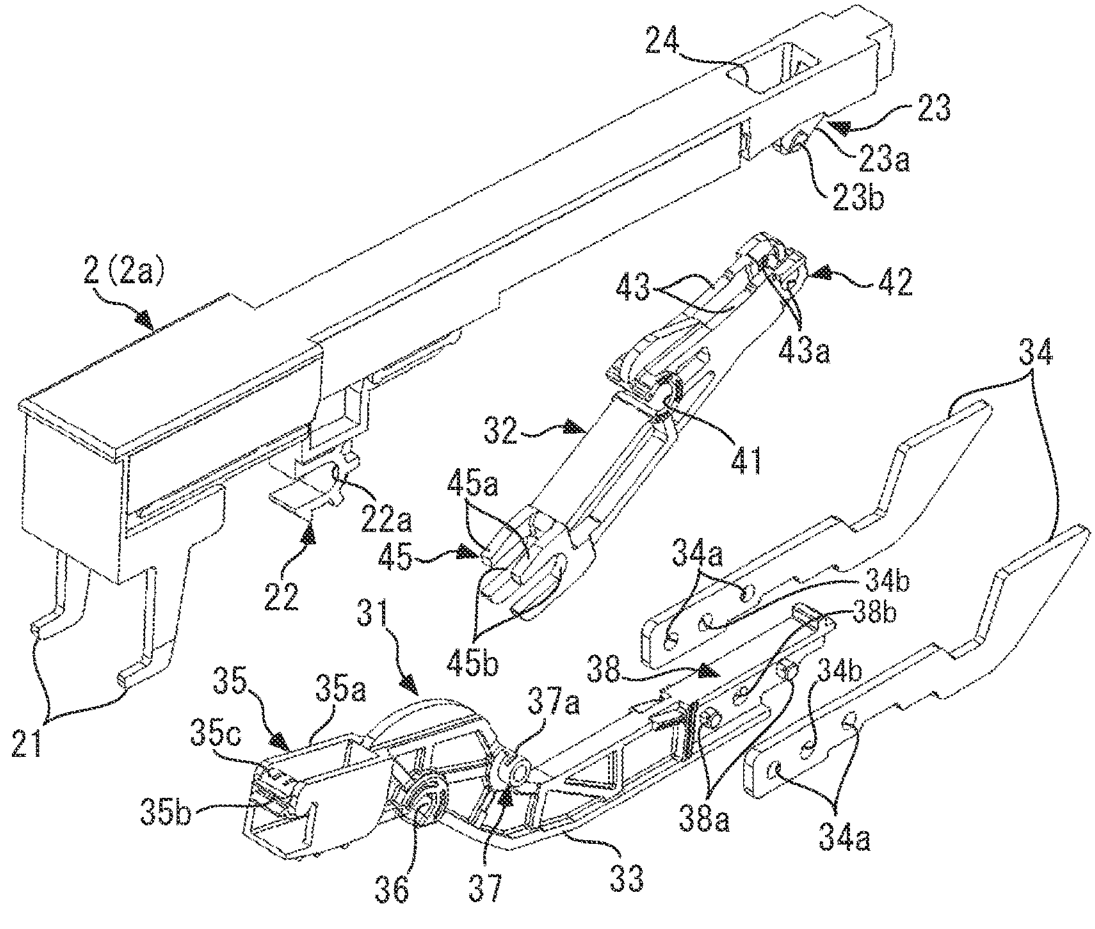

Next, the keys 2 and the key support mechanisms 6*a* will be described. FIG. 4A shows the white key 2*a* and the key support mechanism 6*a* therefor on an enlarged scale, and FIG. 4B shows the white key 2*a* and the key support mechanism 6*a* in an exploded state. As shown in FIGS. 4A and 4B, the white key 2*a* is formed e.g. by injection molding of a predetermined resin material (e.g. an AS resin) into a hollow shape which extends a predetermined length in the front-rear direction and opens downward. The white key 2*a* has the front end thereof formed with the pair of left and right upper limit position regulation portions 21 and 21 which protrude downward from respective side walls of the front end of the white key 2*a* and each having a lower end thereof bent forward. As described hereinabove, the left and right upper limit position regulation portions 21 and 21 are engaged with the respective left and right engagement holes 11*b* and 11*b* of the chassis front 11 in a state inserted therethrough.

Further, at a predetermined location of a front portion of the white key 2*a*, rearward of the upper limit position regulation portions 21, there is formed a key front-side connecting portion 22 connected to the first arm 31 of the key support mechanism 6*a*. This key front-side connecting portion 22 includes a connecting recess 22*a* which has a U shape having a slot-like shape in side view and open forward.

Furthermore, the white key 2*a* has a rear portion thereof provided with a key rear-side connecting portion 23 (key-side connecting portion) connected to the second arm 32 of the key support mechanism 6*a*. The key rear-side connecting portion 23 has a plate-like connecting body portion 23*a* which hangs downward from a laterally central portion of the white key 2*a* and has a predetermined thickness in the left-right direction, and a pair of left and right engagement protrusions 23*b* and 23*b* which coaxially protrude from the left and right side surfaces of the connecting body portion 23*a*, respectively. Further, a rear portion of the white key 2*a* is formed with a tool insertion hole 24 which vertically extends through the rear portion, and is used to insert a predetermined tool from above for disconnecting the white key 2*a* from the second arm 32 of the key support mechanism 6*a* e.g. for maintenance of the keyboard device 1.

Note that a rear end of the white key 2*a* is formed such that it has a lateral width which is smaller than a lateral width of a portion forward of the rear end and is set to approximately the same dimension as a distance between the mutually opposed key guide protrusions 13*b* and 13*b* of the above-described chassis rear 13.

On the other hand, the key support mechanism 6*a* includes the first arm 31 and the second arm 32 which are engaged with each other and are connected to the key front-side connecting portion 22 and the key rear-side connecting portion 23 of the white key 2*a*, respectively. As shown in FIG. 4B, the first arm 31 is comprised of an arm body 33 and two weights 34 and 34 attached to the arm body 33. The arm body 33 is formed as a resin molded article which is made e.g. by injection molding of a predetermined resin material (e.g. polyacetal resin) into a predetermined shape. This arm body 33 extends a predetermined length in the front-rear direction, and has a front end thereof formed with a first arm front-side connecting portion 35 connected to the key front-side connecting portion 22 of the white key 2*a*. The first arm front-side connecting portion 35 includes a box portion 35*a* having a box-like shape open upward and forward, and a connecting shaft 35*b* provided such that it extends in the left-right direction in a state connecting the front-side upper ends of left and right side walls of the box portion 35*a* to each other. The connecting shaft 35*b* is connected to the connecting recess 22*a* of the key front-side connecting portion 22 of the white key 2*a* such that the connecting shaft 35*b* is pivotally movable and is slidable in the front-rear direction. Note that on the above-mentioned connecting shaft 35*b*, there is mounted a bush 35*c* for filling a spacing between the outer peripheral, surface of the connecting shaft 35*b* and the inner surface of the connecting recess 22*a*.

Further, the arm body 33 has the bearing portion 36 formed at a predetermined location immediately rearward of the first arm front-side connecting portion 35. The bearing portion 36 has an inverted U shape open downward in side view, and is pivotally engaged with the first pivot shaft 18*a* of the keyboard chassis 4. Furthermore, the arm body 33 has a first arm rear-side connecting portion 37, which is connected to the second arm 32, at a predetermined location rearward of the bearing portion 36. Specifically, the first arm rear-side connecting portion 37 has a connecting shaft 37*a* (second connecting shaft) which extends in the left-right direction with respective opposite ends thereof protruding outward from the left and right side surfaces of the arm body 33. The opposite ends of the connecting shaft 37*a* are engaged with connecting recesses 45*b* and 45*b* of a second arm front-side connecting portion 45, referred to hereinafter, of the second arm 32.

On a weight mounting portion 38, which is a rear portion of the arm body 33, at respective predetermined locations of each of left and right side surfaces thereof, there are formed two front and rear mounting protrusions 38*a* and 38*a* protruding outward. Between the front and rear mounting protrusions 38*a* and 38*a*, there is formed a mounting hole 38*b* extending through the weight mounting portion 38 in the left-right direction.

The weights 34 are formed of a material (metal such as iron) larger in specific gravity than the arm body 33, and are formed as two elongated and narrow plates. Each weight 34 is formed e.g. by pressing a metal plate into a predetermined shape. Specifically, the weight 34 is formed with two fitting holes 34*a* and 34*a* and a mounting hole 34*b* which are associated with the two mounting protrusions 38*a* and 38*a* and the mounting hole 38*b* of the arm body 33, respectively. The two weights 34 and 34 are fixed to the arm body 33 in a state sandwiching the weight mounting portion 38 of the arm body 33, by caulking rivets (not shown) inserted through the mounting holes 34*b* and 34*b*, and 38*b*.

The second arm 32 is formed as a resin molded article having a predetermined shape by injection molding of the same resin material as that of the arm body 33 of the first arm 31. The second arm 32 is shorter than the first arm 31 and extends a predetermined length in the front-rear direction. Further, the second arm 32 has a bearing portion 41 having a C shape open forward in side view at about a longitudinal center thereof. The bearing portion 41 is pivotally engaged with an associated one of the second pivot shafts 19*a* of the keyboard chassis 4.

Further, the second arm 32 has a rear portion thereof provided with a second arm rear-side connecting portion 42 connected to the key rear-side connecting portion 23 of the white key 2*a*. The second arm rear-side connecting portion 42 is formed into a bifurcated shape, and has two left and right connecting arm portions 43 and 43 which extend a predetermined length parallel to each other along the longitudinal direction of the second arm 32. Each connecting arm portion 43 has a rear end thereof formed with a connecting hole 43*a* (fitting portion) extending through the connecting arm portion 43 in the left-right direction. The two connecting arm portions 43 and 43 sandwich the connecting body portion 23*a* of the key rear-side connecting portion 23 of the white key 2*a* between the rear ends thereof from the left and the right, and each connecting hole 43*a* has an associated one of the engagement protrusions 23*b* of the key rear-side connecting portion 23 pivotally fitted therein. Note that the connecting arm portions 43 and 43 are formed such that when brought into engagement with and disengagement from the connecting body portion 23*a* and the engagement protrusions 23*b*, the connecting arm portions 43 and 43 are bent to increase the distance between the rear ends thereof so as to allow the engagement and disengagement between the portions 43 and the portions 23*a* and 23*b*.

Furthermore, the second arm 32 has a front portion thereof provided with the second arm front-side connecting portion 45 connected to the first arm rear-side connecting portion 37 (connecting shaft 37*a*) of the first arm 31. The second arm front-side connecting portion 45 has the pair of left and right connecting pieces 45*a* and 45*a* arranged with a predetermined spacing in the left-right direction. The connecting pieces 45*a* and 45*a* are each formed with a connecting recess 45*b* (second connecting recess) which has a U shape having a slot-like shape in side view and open forward. The left and right connecting pieces 45*a* and 45*a* of the second arm front-side connecting portion 45 are pivotally and slidably fitted in the respective opposite ends of the connecting shaft 37*a* of the first arm 31 via the connecting recesses 45*b* and 45*b* thereof.

Figure 5A:
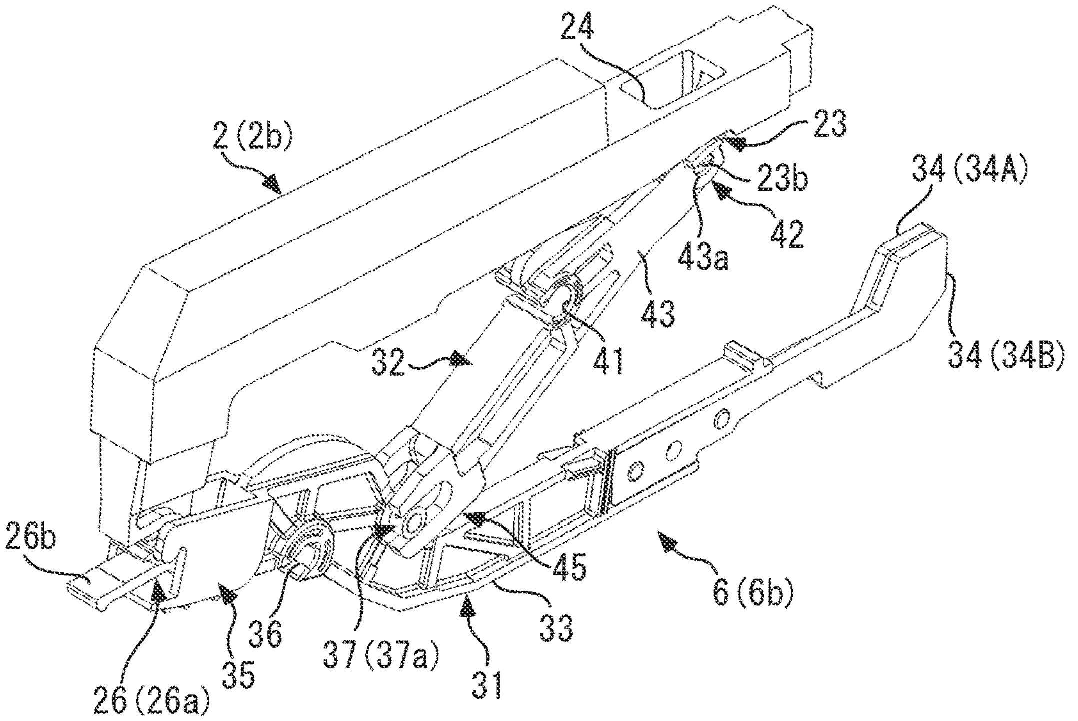
Figure 5B:
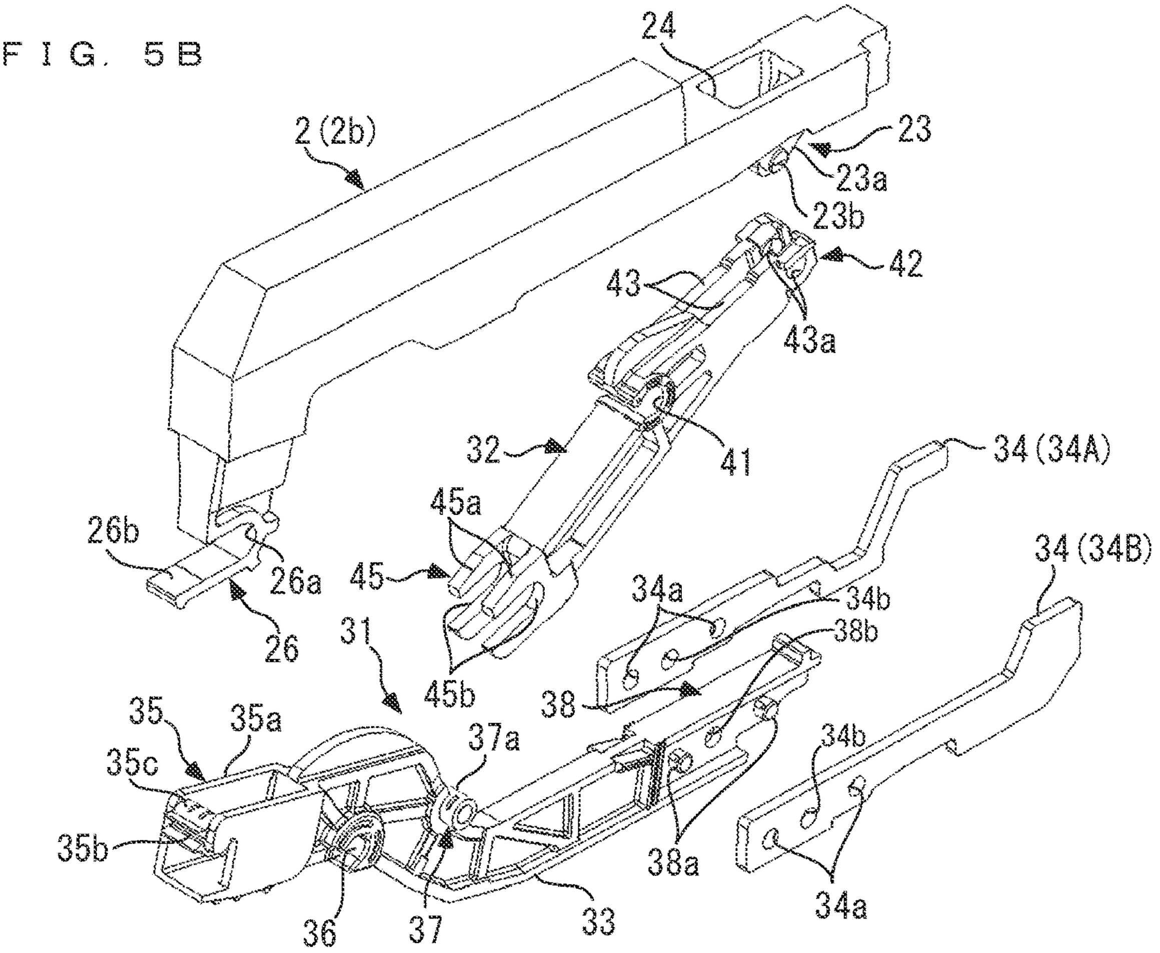

FIG. 5A shows the black key 2*b* and the key support mechanism 6*b* therefor on an enlarged scale, and FIG. 5B shows the black key 2*b* and the key support mechanism 6*b* in an exploded state. The black key 2*b* is formed e.g. by injection molding of the same resin material as that of the white key 2*a* into a hollow shape which extends in the front-rear direction by a predetermined length shorter than that of the white key 2 and opens downward. The black key 2*b* has a front-side lower end thereof provided with a key front-side connecting portion 26 formed substantially similar to the key front-side connecting portion 22 of the white key 2*a*. This key front-side connecting portion 26 has a connecting recess 26*a* (first connecting recess) which has a U shape having a slot-like shape in side view and open forward. Further, the key front-side connecting portion 26 has an extension portion 26*b* on a lower-side front end of the connecting recess 26*a*. The extension portion 26*b* extends a predetermined length forward of the front surface of the body of the black key 2*b*. This extension portion 26*b* functions as an upper limit position regulation portion of the b lack key 2*b*. Note that in the following description, the components of the black key 2*b* and the key support mechanism 6*b* having the same configurations as those of the above-described white key 2*a* and key support mechanism 6*a* are denoted by the same reference numerals and detailed description thereof will be omitted.

Similar to the white key 2*a*, the black key 2*b* has a rear portion thereof formed with the key rear-side connecting portion 23 and the tool insertion hole 24 which vertically extends through a rear portion of the black key 2*b*.

On the other hand, the key support mechanism 6*b* supporting the black key 2*b* is constructed substantially similar to the above-described white key-associated key support mechanism 6*a*. Specifically, the arm body 33 of the first arm 31 of the key support mechanism 6*b* and the second arm 32 of the same are constructed exactly similar in shape and size to the arm body 33 and the second arm 32 of the white key-associated key support mechanism 6*a*. Further, two left and right weights 34A and 34B of the black key-associated key support mechanism 6*b* differ from the weights 34 of the white key-associated key support mechanism 6*a* by the shape of the rear portion thereof. In addition, the left weight 34A and the right weight 34B of the key support mechanism 6*b* differ from each other by the shape of their rear portions.

Figure 6A:
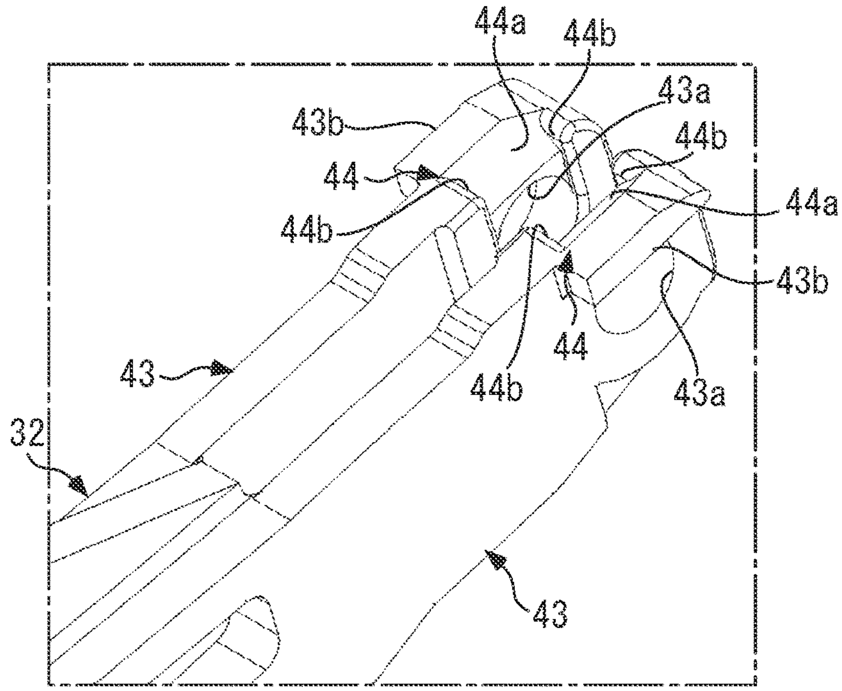
FIGS. 6A, 6B, and 6C are an enlarged perspective view of a rear end of a second arm, a view of rear ends of a key and the second arm in a state separated from each other, as viewed from below, and an enlarged plan view of rear portions of the key and the second arm.
Figure 6B:
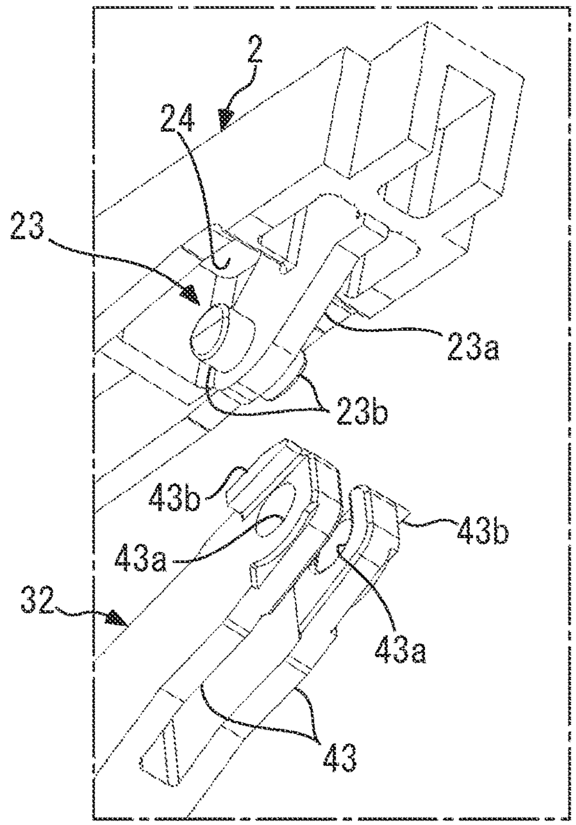
Figure 6C:
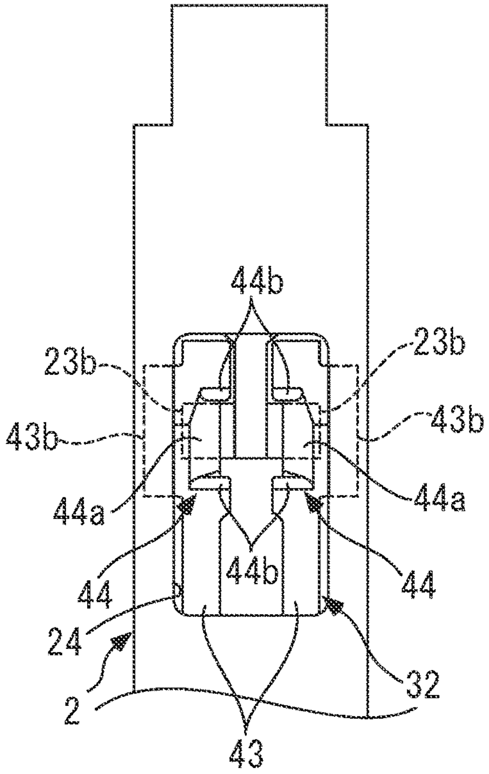

Now, the construction of a rear end of the second arm 32, i.e. rear ends of the two left and right connecting arm portions 43 and 43 will be described in more detail with reference to FIGS. 6A to 6C. As shown in FIG. 6A, each connecting arm portion 43 is provided, on an upper side of the connecting hole 43*a*, with a guide portion 44 for guiding an associated one of the engagement protrusions 23*b* of the key 2 to the connecting hole 43*a*. The guide portion 44 has a sloped guide surface 44*a* which is sloped downward as it extends toward the inside of the connecting arm portion 43, and front and rear erected guide surfaces 44*b* and 44*b* which are formed in an erected state at respective locations forward and rearward of the sloped guide surface 44*a* such that the two 44*b* and 44*b* are opposed to each other. Note that the upper ends of the front and rear erected guide surfaces 44*b* and 44*b* are formed into an arcuate shape.

The two left and right connecting arm portions 43 and 43 of the second arm 32 have the guide portions 44 and 44 formed as above, whereby when the key 2 and the second arm 32 are connected, the pair of left and right engagement protrusions 23*b* and 23*b* of the key 2 are guided to the connecting holes 43*a* and 43*a* located therebelow by the two guide portions 44 of the second arm 32, respectively. With this, when keyboard device 1 is assembled, it is possible to easily connect the key 2 and the second arm 32.

Further, the two left and right connecting arm portions 43 and 43 of the second arm 32 have upper surface rear ends thereof formed with coming-off prevention portions 43*b* and 43*b* which protrude a predetermined length outward in the left-right direction for preventing the engagement protrusions 23*b* and 23*b* of the key 2 from coming off from associated ones of the connecting holes 43*a* and 43*a* of the second arm 32, respectively.

As shown in FIG. 60, in a state in which the left and right engagement protrusions 23*b* and 23*b* of the key 2 are fitted in the two connecting holes 43*a* and 43*a*, the left and right coming-off prevention portions 43*b* and 43*b* are located immediately below the left and right side walls of the key 2. Therefore, for example, even when the rear end of the key 2 is displaced downward with respect to the rear end of the second arm 32, due to having the rear end or its vicinity of the key 2 hit hard by key depression, the left and right side walls of the key 2 hit against the left and right coming-off prevention portions 43*b* and 43*b*, and hence it is possible to prevent the rear end of the key from being largely displaced downward. As a consequence, it is possible to prevent the left and right engagement protrusions 23*b* and 23*b* of the key 2 from being removed from the connecting holes 43*a* and 43*a* of the second arm 32.

Figure 7:
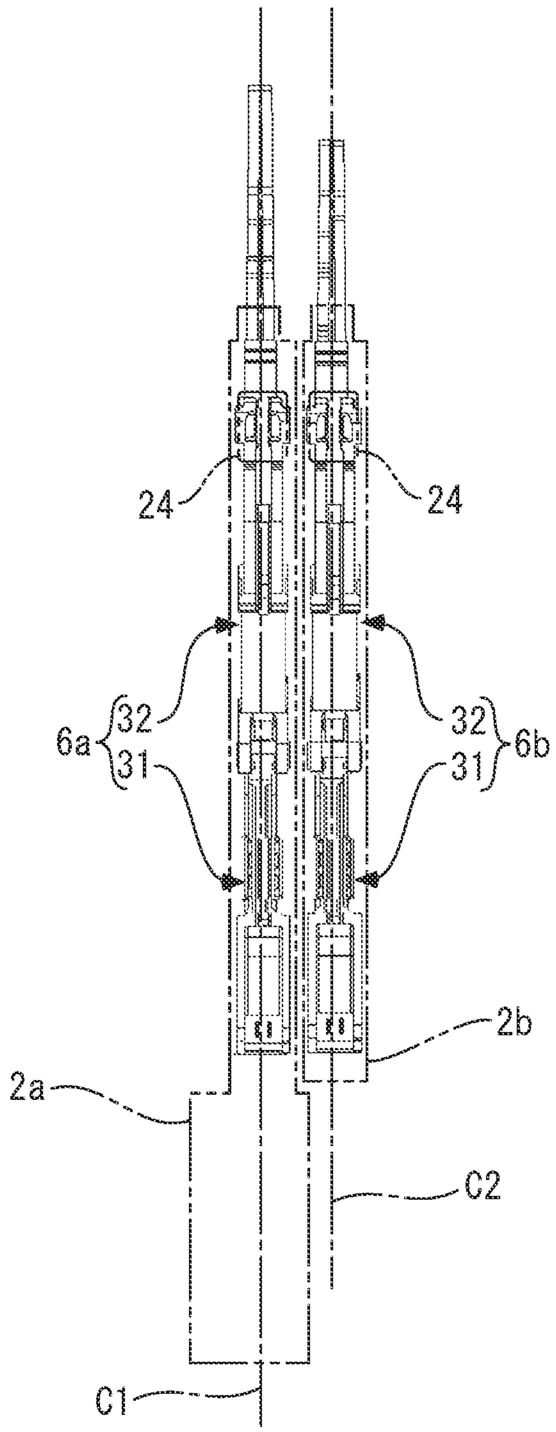
FIG. 7 is a plan view of the white key and the key support mechanism therefor as well as the black key and the key support mechanism therefor, in which the white key and the black key are indicated by two-dot chain lines.

FIG. 7 is a plan view of the white key 2*a* and the key support mechanism 6*a* therefor as well as the black key 2*b* and the key support mechanism 6*b* therefor, in which the white key 2*a* and the black key 2*b* are indicated by two-dot chain lines. Referring to FIG. 7, the white key 2*a*, the first arm 31 and the second arm 32 of the key support mechanism. 6*a* are arranged such that a center line of the white key 2*a* extending along the longitudinal direction thereof (in a vertical direction as viewed in FIG. 7), a center line of the first arm 31 of the key support mechanism. 6*a* extending along the longitudinal direction thereof, and a center line of the second arm 32 extending along the longitudinal direction thereof all coincide with a center line C1, as viewed in plan view. This is also the case with the black key 2*b*. That is, the black key 2*b*, and the first arm 31 and the second arm 32 of the key support mechanism 6*b* are arranged such that respective center lines thereof all coincide with a center line C2, as viewed in plan view.

As described above, in the keyboard device 1, the keys 2 and the first and second arms 31 and 32 of the key support mechanisms 6 that support the keys 2 are arranged such that the center lines thereof in their longitudinal directions coincide with with each other, as viewed in plan view, so that when the key is depressed, it is possible to stably and securely receive forces for depressing the keys 2 by the key support mechanisms 6, whereby it is possible to improve rigidity and durability of the whole keyboard device 1.

As described heretofore, in the white key-associated key support mechanism 6*a* and the black key-associated key support mechanism 6*b*, since the arm bodies 33 of the first arms 31 are constructed similar to each other in shape and size, and the second arms 32 are constructed similar to each other in shape and size, it is possible to commonalize the arm bodies 33 of the first arms 31 and commonalize the second arms 32 in the white key-associated and black key-associated key support mechanisms 6. With this, compared with e.g. a case where the first arm and the second arm are different for each type of keys 2, it is possible to reduce the types of molds for manufacturing the first arms 31 and the second arms 32, which makes it possible to suppress increase in the manufacturing costs of the keyboard device as a whole.

Further, the weight 34 provided in the first arm 31 of the key support mechanism 6 can be selected from a plurality of weights different in shape from each other according to the type of the key 2. With this, e.g. even when the angle of pivotal motion of the first arm 31 during depression of the key 2 varies depending on the type of the key 2, it is possible, by selecting a proper weight from the plurality of weights, to bring the weight 34 of the first arms 31 into appropriate contact with the first arm upper limit stopper 10*a* in accordance with the depression of the key 2.

Figure 8A:
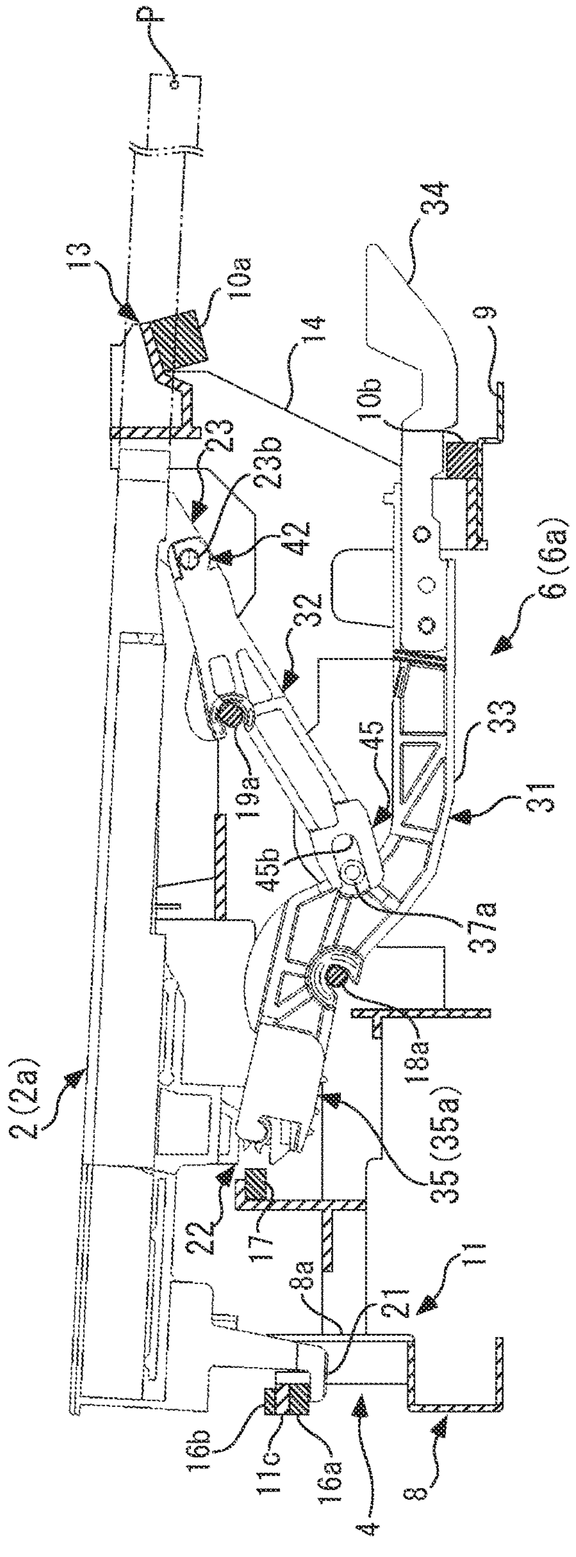
Figure 8B:
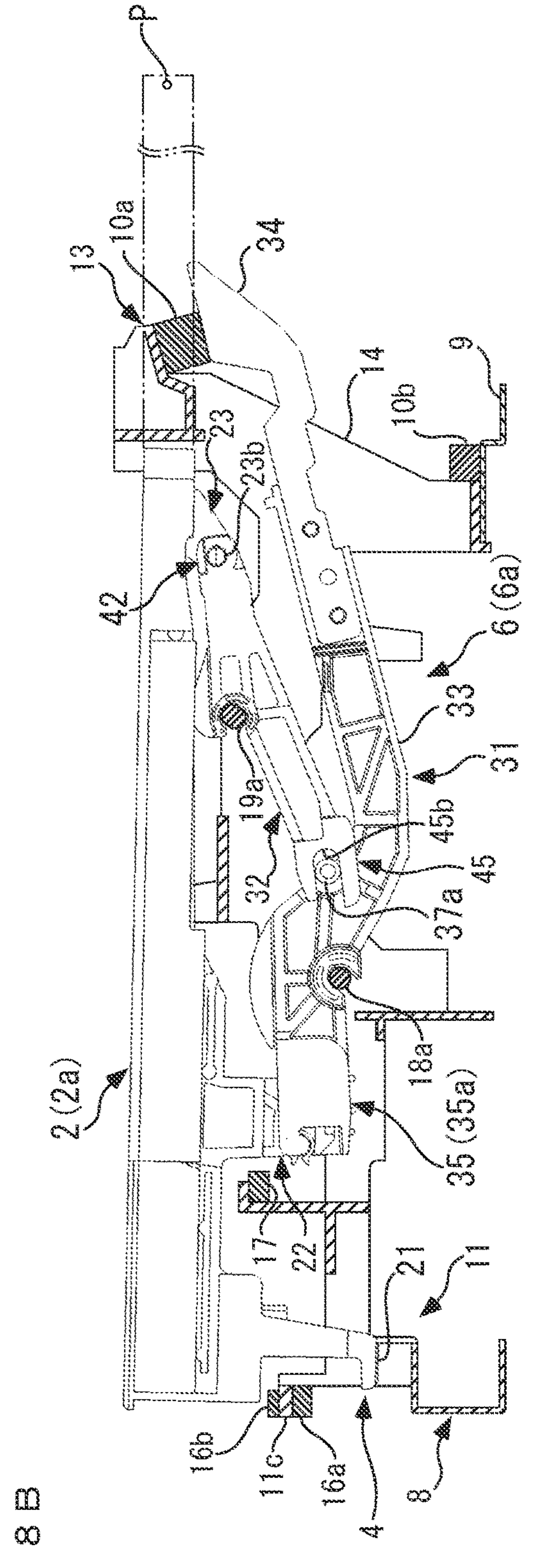
Figure 9A:
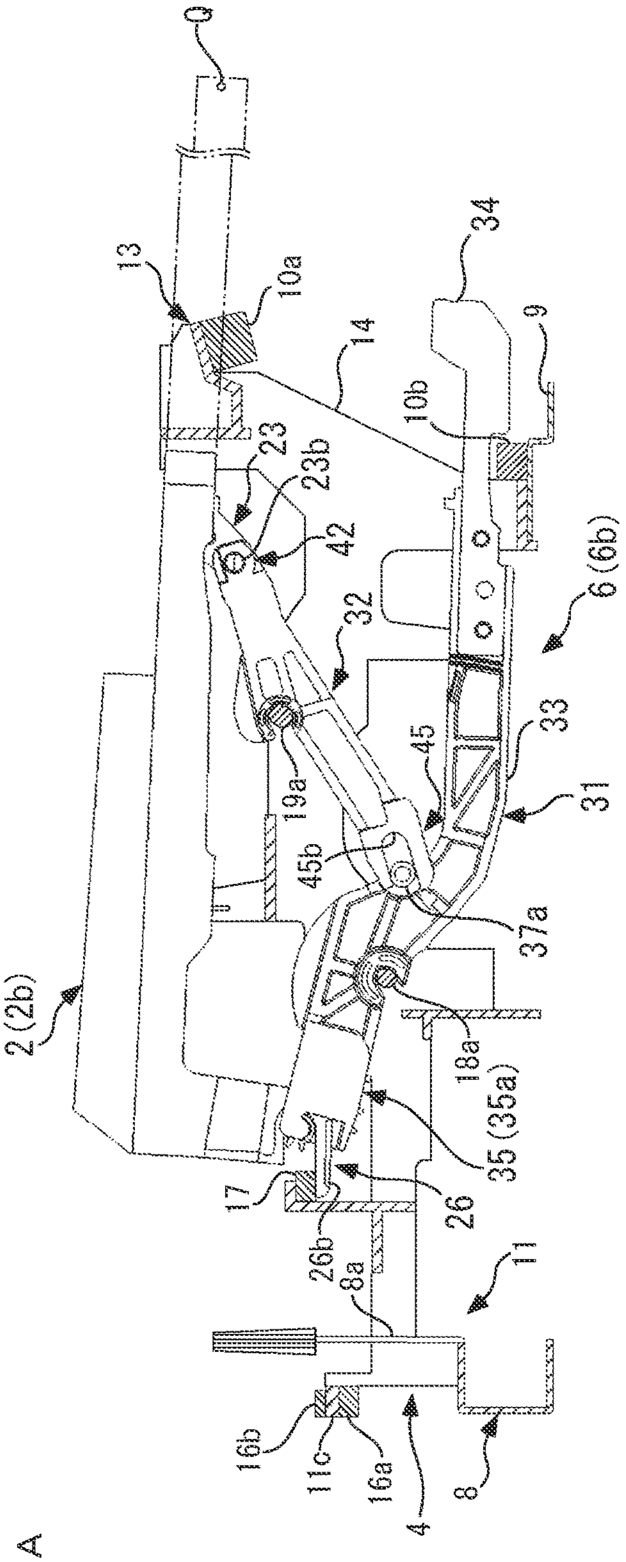
Figure 9B:
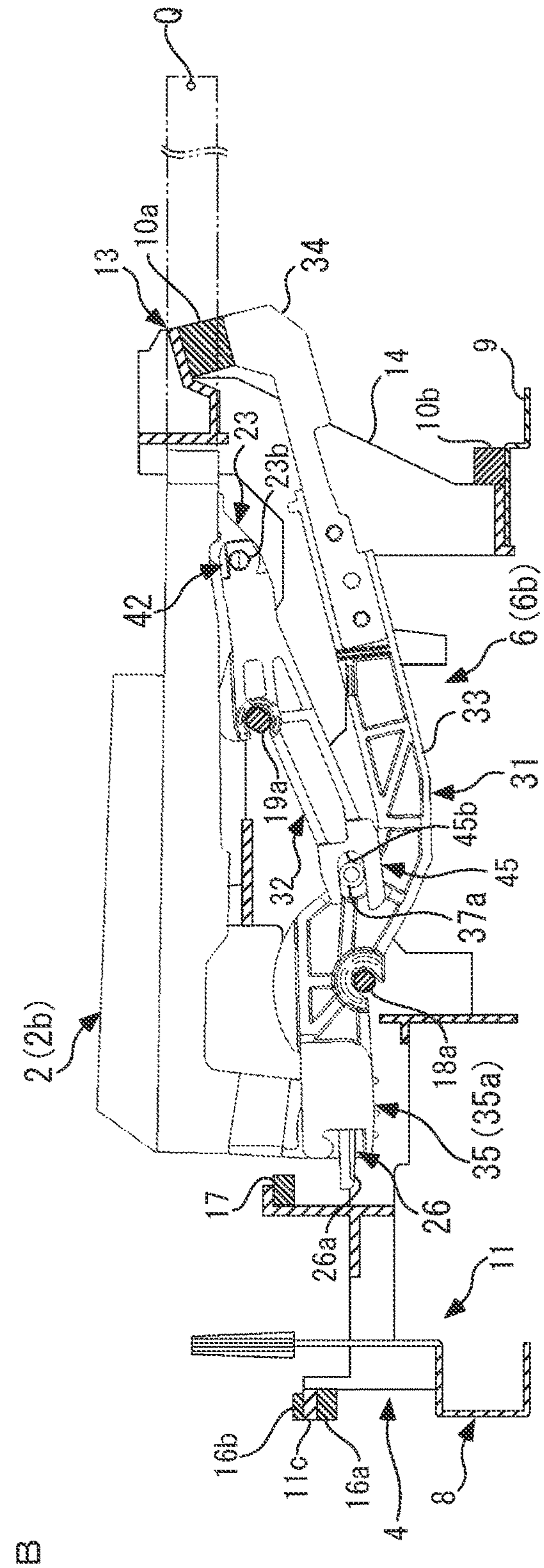

Next, a description will be given of the operation of the keys 2 and the key support mechanisms 6 in the keyboard device 1 constructed as described above. FIGS. 8A and 8B are views useful in explaining the operation of the white key 2*a* and the key support mechanism. 6*a* associated therewith. FIGS. 9A and 9B are views useful in explaining the operation of the black key 2*b* and the key support mechanism 6*b* associated therewith.

When the front end of the white key 2*a* is depressed by a player with his/her finger from a key-released state shown in FIG. 8A, the key front-side connecting portion 22 of the white key 2*a* moves downward, whereby the first arm 31 is pivotally moved in a counterclockwise direction about the first pivot shaft 18*a*. Further, in accordance with the pivotal motion of the first arm 31, the second arm front-side connecting portion 45, which is engaged with the connecting shaft 37*a* of the first arm 31 via the connecting recesses 45*b* and 45*b*, moves upward. With this, the second arm 32 is pivotally moved in a clockwise direction about the second pivot shaft 19*a*. Then, in accordance with this pivotal motion of the second arm 32, the key rear-side connecting portion 23, which is connected to the second arm 32 via the second arm rear-side connecting portion 42 formed at the rear end of the second arm 32, is pulled down, whereby the rear end of the white key 2*a* is moved downward.

Note that during the above-mentioned pivotal motion of the first arm 31, the box portion 35*a* of the first arm front-side connecting portion 35 moves downward, and accordingly, the switch body of one of the key switches, which is associated with the depressed key 2, is pressed from above by the bottom wall of the box portion 35*a*. As a consequence, in the electronic piano, key depression information of the depressed key 2 is detected, and based on the detected key depression information, sound is generated from a speaker, not shown.

As described hereinabove, in the case where the white key 2*a* is depressed, in accordance with the counterclockwise pivotal motion of the first arm 31, the weight 34 of the first arm 31 is tilted such that the weight 34 becomes higher as it extends rearward, whereby the rear end of the weight 34 is brought into contact with the first arm upper limit stopper 10*a* from below, as shown in FIG. 8B. This prevents further pivotal motion of the first arm 31.

During the above-mentioned pivotal motion of the first arm 31 having the weight 34, the own weight of the weight 34 acts on a rear portion of the first arm 31, whereby forces act on the first arm 31 and the second arm 32 to pivotally move upward the front end (first arm front-side connecting portion 35) of the first arm 31 and the rear end (second arm rear-side connecting portion 42) of the second arm 32. As a consequence, the white key 2*a* is firmly supported from below by the key support mechanism 6*a*, whereby during depression of the white key 2*a*, touch weight as a reaction force against the depression becomes larger.

When the front end of the white key 2*a* is depressed to its lowest position, the front end of the white key 2*a* moves into contact with the key lower limit stopper 16*b*, which blocks further depression of the white key 2.

The white key 2*a* depressed as above operates such that it pivotally moves about a virtual pivot P located rearward of the rear end thereof. The location of the virtual pivot P is set such that a distance from the front end of the white key 2*a* becomes approximately twice as long as the length of the white key 2*a* itself, for example. With this, when the front end of the white key 2*a* is depressed to the lowest position, compared with the case where the white key 2*a* is in the key-released state shown in FIG. 8A, the front end of the white key 2*a* is located lower by a predetermined key stroke (e.g. 10 mm) and the rear end of the white key 2*a* is located lower by a distance (e.g. 5 mm), which is approximately half of the above key stroke.

On the other hand, when the finger is released from the white key 2*a* being depressed, the first arm 31 of the key support mechanism 6 pivotally moves in a direction opposite to the above-mentioned direction, by the own weight of the weight 34, and in accordance therewith, the second arm 32 as well pivotally moves in a direction opposite to the above-mentioned direction. In accordance with this pivotal motion of the second arm 32, the white key 2*a* pivotally moves upward about the virtual pivot P. Then, the two upper limit position regulation portions 21 and 21 of the white key 2*a* are brought into contact with the key upper limit stopper 16*a* from below, whereby further pivotal motion of the white key 2*a* is blocked, and the white key 2*a* returns to its original key-released state.

Further, operation in response to depression of the black key 2*b* is performed similar to the above-described operation of the white key 2*a* and the key support mechanism 6*a* in response to depression of the white key 2*a*. More specifically, when a front end of the black key 2*b* is depressed from a key released state shown in FIG. 9A, the first arm 31 is pivotally moved in the counterclockwise direction about the first pivot shaft 18*a*, and the second arm 32 is pivotally moved in the clockwise direction about the second pivot shaft 19*a*. With this, the black key 2*b* operates such that it pivotally moves about a virtual pivot Q located rearward of the rear end thereof. Note that similar to the above-mentioned virtual pivot P of the white key 2*a*, the location of the virtual pivot Q is set such that a distance from the front end of the black key 2*b* becomes approximately twice as long as the length of the black key 2*b* itself, for example. Therefore, when the front end of the black key 2*b* is depressed to its lowest position, compared with a case where the black key is in a key-released state shown in FIG. 9A, the from, end of the black key 2*b* is located lower by a predetermined key stroke and the rear end thereof is located lower by a distance which is approximately half of the above key stroke.

On the other hand, when the finger is released from the black key 2*b* being depressed, the first arm 31 and the second arm 32 of the key support mechanism 6 pivotally move in a direction opposite to the above-mentioned direction, and in accordance therewith, the black key 2*b* pivotally moves upward about the virtual pivot Q. Then, the extension portion 26*b* of the key front-side connecting portion 26 of the black key 2*b* moves into contact with the key upper limit stopper 17 from below, whereby further pivotal motion of the black key 2*b* is blocked, and the black key 2*b* returns to its original key-released state.

As described in detail heretofore, according to the keyboard device 1 of the present embodiment, it is possible to obtain various advantageous effects described hereinabove.

Further, e.g. during assembly of the keyboard device 1, to connect the key 2 and the first arm 31, simply by inserting the connecting shaft 35*b* of the first arm 31 into the connecting recess 22*a* of the key 2, it is possible to easily perform the operation for connecting the key 2 and the first arm 31. Further, to connect the key 2 and the second arm 32, by pushing the respective connecting arm portions 43 and 43 laterally outward while inserting the connecting body portion 23*a* of the key 2 between the two connecting arm portions 43 and 43 of the second arm 32, and fitting the two engagement protrusions 23*b* and 23*b* of the connecting body portion 23*a* in the respective connecting holes 43*a* and 43*a* of the connecting arm portions 43 and 43, it is possible to easily perform the operation for connecting the key 2 and the second arm 32. Furthermore, to connect the first arm 31 and the second arm 32, simply by inserting the connecting shaft 37*a* of the first arm 31 into the two connecting recesses 45*b* and 45*b* of the second arm 32, it is possible to easily perform the operation for connecting the first arm 31 and the second arm 32.

Note that the present invention is not limited to the above-described embodiments, but it can be practiced in various forms. For example, although in the above-described embodiments, the key 2 and the first and second arms 31 and 32 of the key support mechanism 6 that supports the key 2 are arranged such that the center lines thereof extending along their longitudinal directions coincide with each other, as viewed in plan view, the present is not limited to this, but it is only required to arrange at least two of the key 2 and the first and second arms 31 and 32 such that the above-mentioned center lines thereof coincide with each other, as viewed in plan view.

Further, although in the embodiment, in the connection structure for connecting the key front-side connecting portion 22 of the key 2*a* and the first arm front-side connecting portion 35 of the first arm 31, the connecting recess 22*a* is formed on the side of the key 2 and the connecting shaft 35*b* is formed on the side of the first arm 31, the present invention is not limited to this, but the connecting shaft may be formed on the side of the key 2 and the connecting recess may be formed on the side of the first arm 31. Further, although as the above-described connecting recess 22*a*, one is employed which has a U shape having a slot-like shape in side view and open forward, it is possible to employ a recess simply having a slot-like shape. In this case, it is possible to connect the key front-side connecting portion 22 and the first arm front-side connecting portion 35 by forming the connecting portion 35 of the first arm. 31 such that the left and right opposite ends thereof protrude outward, and forming the connecting recess 22*a* as a pair of left and right connecting recesses, for snap-fitting these left and right connecting recesses on the opposite ends of the connecting shaft.

Further, although in the embodiment, in the connection structure for connecting the key rear-side connecting portion 23 of the key 2 and the second arm rear-side connecting portion 42 of the second arm 32, the connecting body portion 23*a* and the left and right engagement protrusions 23*b* and 23*b* are formed on the side of the key 2, and the left and right connecting arm portions 43 and 43 and the connecting holes 43*a* and 43*a* are formed on the side of the second arm 32, the present invention is not limited to this, but the connecting arm portions and the connecting holes may be formed on the side of the key 2, and the connecting body portion and the engagement protrusions may be formed on the side of the second arm 32.

Furthermore, although in the embodiment, in the connection structure for connecting the first arm rear-side connecting portion 37 of the first arm 31 and the second arm front-side connecting portion 45 of the second arm 32, the connecting shaft 37*a* is formed on the side of the first arm 31, and the connecting recesses 45*b* and 45*b* are formed on the side of the second arm 32, the present invention is not limited to this, but the connecting recesses may be formed on the side of the first arm 31, and the connecting shaft may be formed on the side of the second arm 32. Further, although as the above-described connecting recess 45*b*, one is employed which has a U shape having a slot-like shape in side view and open forward, it is possible to employ a connecting recess simply having a slot-like shape. In this case, it is possible to connect the first arm rear-side connecting portion 37 and the second arm front-side connecting portion 45 by snap-fitting the connecting recesses simply having a slot-like shape on the respective opposite ends of the connecting shaft 37*a* via the pair of left and right connecting pieces 45*a* and 45*a* each having the connecting recess formed thereon.

Further, the connection structures for connecting between the key 2, the first arm 31 and the second arm 32 are not limited to the above-described connection structures, but it is possible to employ connection structures for connecting between other members or any other suitable connection structures insofar as they are capable of ensuring a connection function(s) (pivot function and/or slide function) required of members connected to each other.

Further, although in the embodiment, the weight 34 is provided on the first arm 31 of the key support mechanism 6, the present invention is not limited to this, but the weight 34 may be provided on the second arm 32 in place of the first arm 31. Furthermore, although in the embodiment, each of the key switches for detecting key depression information is configured such that it is pressed from above by the box portion 35*a* of the first arm front-side connecting portion 35 of the first arm 31, the present invention is not limited to this, but the above-described key switch may be provided within the movable range of the second arm 32 such that it is pressed by the second arm 32.

Further, details of the constructions of the keys 2, and the first and second arms 31 and 32 of the key support mechanisms 6 shown in the embodiment are given only by way of example, and they can be modified as appropriate within the scope of the subject matter of the present invention.

What is claimed is:

1. A keyboard device for a keyboard instrument, comprising:

a keyboard chassis;

a plurality of keys provided on the keyboard chassis and each extending a predetermined length in a front-rear direction, the keys being arranged in a state arranged side by side in a left-right direction; and a plurality of key support mechanisms each provided in a state engaged with the keyboard chassis and arranged side by side in the left-right direction, each for supporting an associated one of the keys from below, wherein the key support mechanisms each include an arm configured to extend in the front-rear direction and swingably engaged with a pivot shaft provided on the keyboard chassis, the arm being pivotally connected to a key-side connecting portion formed on a predetermined portion of an associated one of the keys via an arm-side connecting portion formed on an end of the arm, wherein the key-side connecting portion includes:

a plate-like connecting body portion hanging downward from the key and having a predetermined thickness in the left-right direction, and a pair of engagement protrusions coaxially protruding to the left and the right from the connecting body portion, respectively, wherein the arm-side connecting portion includes:

two connecting arm portions formed in a bifurcated shape extending a predetermined length along a longitudinal direction of the arm, the connecting arm portions being capable of sandwiching the connecting body portion from the left and the right, and fitting portions provided on the respective connecting arm portions and having associated ones of the engagement protrusions pivotally fitted therein.

2. The keyboard device according to claim 1, wherein the two connecting arm portions are formed to bend, when engaged with and disengaged from the connecting body portion and the pair of engagement protrusions, such that a distance between tip ends of the two connecting arm portions is increased so as to allow the engagement with and disengagement from the connecting body portion and the pair of engagement protrusions.

3. The keyboard device according to claim 2, wherein the key-side connecting portion is formed on a rear portion of the key, and wherein the rear portion of the key is provided with a tool insertion hole which vertically extends through the rear portion, for inserting a predetermined tool from above between the two connecting arm portions when the two connecting arm portions are disengaged from the connecting body portion and the pair of engagement protrusions.

4. The keyboard device according to claim 2, wherein each of the two connecting arm portions includes a guide portion provided above the fitting portion, for guiding each of the pair of engagement protrusions to an associated one of the fitting portions when the key and the arm are connected.

5. The keyboard device according to claim 4, wherein each of the two connecting arm portions further includes a coming-off prevention portion which is provided above the fitting portion in a manner protruding outward in the left-right direction, for preventing the engagement protrusion from coming off from the associated fitting portion.

6. The keyboard device according to claim 3, wherein the keyboard chassis is provided with key rear-side guide portions for guiding the rear portions of the keys.

7. A keyboard device for a keyboard instrument, comprising:

a keyboard chassis;

a plurality of keys provided on the keyboard chassis and each extending a predetermined length in a front-rear direction, the keys being arranged in a state arranged side by side in a left-right direction; and a plurality of key support mechanisms each provided in a state engaged with the keyboard chassis and arranged side by side in the left-right direction, each for supporting an associated one of the keys from below, the plurality of key support mechanisms each causing, upon depression of the associated one of the keys, the depressed key to operate such that the key pivotally moves about a virtual pivot located rearward of a rear end of the key, wherein the key support mechanisms each include:

a first arm configured to extend a predetermined length in the front-rear direction and be swingably engaged with a first pivot shaft provided on the keyboard chassis, the first arm including a first arm front-side connecting portion which is disposed forward of the first pivot shaft and is pivotally and/or slidably connected to a key front-side connecting portion provided on a front portion of the associated key, and a second arm configured to extend a predetermined length in the front-rear direction and be swingably engaged with a second pivot shaft provided on the keyboard chassis at a location rearward of the first pivot shaft, the second arm including a second arm rear-side connecting portion which is disposed rearward of the second pivot shaft and is pivotally connected to a key rear-side connecting portion provided on a rear portion of the associated key, and a second arm front-side connecting portion which is disposed forward of the second pivot shaft and is pivotally and/or slidably connected to a first arm rear-side connecting portion rearward of the first pivot shaft of the first arm, and wherein at least two of the key and the first and second arms of each key support mechanism which supports the key are arranged such that center lines of the at least two extending along their longitudinal directions coincide with each other, as viewed in plan view.

8. The keyboard device according to claim 7, wherein one of the key front-side connecting portion and the first arm front-side connecting portion includes a first connecting shaft extending in the left-right direction, and wherein the other of the key front-side connecting portion and the first arm front-side connecting portion includes a first connecting recess formed to have a slot-like shape in side view with one end thereof open or have a slot-like shape in side view, for engagement with the first connecting shaft.

9. The keyboard device according to claim 7, wherein one of the key rear-side connecting portion and the second arm rear-side connecting portion includes:

a plate-like connecting body portion having a predetermined thickness in the left-right direction, and a pair of engagement protrusions coaxially protruding to the left and the right from the connecting body portion, respectively, and wherein the other of the key rear-side connecting portion and the second arm rear-side connecting portion includes:

two connecting arm portions formed into a bifurcated shape and configured to be capable of sandwiching the connecting body portion from the left and the right; and fitting portions provided in the respective connecting arm portions, for having associated ones of the engagement protrusions pivotally fitted therein.

10. The keyboard device according to claim 7, wherein one of the first arm rear-side connecting portion and the second arm front-side connecting portion includes a second connection shaft extending in the left-right direction, and wherein the other of the first arm rear-side connecting portion and the second arm front-side connecting portion includes a second connecting recess formed to have a slot-like shape in side view with one end thereof open or have a slot-like shape in side view, for engagement with the second connecting shaft.

11. The keyboard device according to claim 7, wherein a weight for adding a touch weight to the key is provided at a predetermined location of one of the first arm and the second arm.

12. The keyboard device according to claim 7, wherein the keyboard chassis is provided with key switches each for detecting, upon key depression, key depression information of a depressed key by being pressed by one of the first arm and the second arm in accordance with key depression.

13. A keyboard device for a keyboard instrument, comprising:

a keyboard chassis;

a plurality of keys provided on the keyboard chassis and each extending a predetermined length in a front-rear direction, the keys being arranged in a state arranged side by side in a left-right direction; and a plurality of key support mechanisms each provided in a state engaged with the keyboard chassis and arranged side by side in the left-right direction, each for supporting an associated one of the keys from below, the plurality of key support mechanisms each causing, upon depression of the associated one of the keys, the depressed key to operate such that the key pivotally moves about a virtual pivot located rearward of a rear end of the key, wherein the key support mechanisms each include:

a first arm configured to extend a predetermined length in the front-rear direction and be swingably engaged with a first pivot shaft provided on the keyboard chassis, the first arm including a first arm front-side connecting portion which is disposed forward of the first pivot shaft and is pivotally and/or slidably connected to a key front-side connecting portion provided on a front portion of the associated key, and a second arm configured to extend a predetermined length in the front-rear direction and be swingably engaged with a second pivot shaft provided on the keyboard chassis at a location rearward of and higher than the first pivot shaft, the second arm including a second arm rear-side connecting portion which is disposed rearward of the second pivot shaft and is pivotally connected to a key rear-side connecting portion provided on a rear portion of the associated key, and a second arm front-side connecting portion which is disposed forward of the second pivot shaft and is pivotally and/or slidably connected to a first arm rear-side connecting portion rearward of the first-pivot shaft of the first arm, and wherein the keyboard chassis is provided with an arm assembling opening open at least either upward or forward, for assembling the first arm and the second arm to the keyboard chassis.

14. The keyboard device according to claim 13, wherein the keyboard chassis includes a plurality of chassis bodies each formed as a resin molded article and connected to each other in the left-right direction, wherein each chassis body comprises:

the first pivot shaft and the second pivot shaft, and at least one of a key front-side guide portion for guiding a front end of the key, a key rear-side guide portion for guiding a rear end of the key, a key upper limit stopper portion for restricting an upper limit position of the front end of the key, a key lower limit stopper portion for restricting a lower limit position of the front end of the key, a first arm upper limit stopper portion for restricting an upper limit position of a rear end of the first arm, a first arm lower limit stopper portion for restricting a lower limit position of the rear end of the first arm, a first arm side surface guide portion for guiding a side surface of the first arm, and a second arm side surface guide portion for guiding a side surface of the second arm, wherein the first pivot shaft and the second pivot shaft, and at least one of the key front-side guide portion, the key rear-side guide portion, the key upper limit stopper portion, the key lower limit stopper portion, the first arm upper limit stopper portion, the first arm lower limit stopper portion, the first arm side surface guide portion, and the second arm side surface guide portion are integrally formed with each other via a plurality of ribs extending in the front-rear direction and arranged with a spacing therebetween in the left-right direction.

15. The keyboard device according to claim 14, wherein the first pivot shaft comprises a plurality of first pivot shafts each provided between each adjacent two of the plurality of ribs, wherein the second pivot shaft comprises a plurality of second pivot shafts each provided between each adjacent two of the plurality of ribs, and wherein at least either the plurality of first pivot shafts or the plurality of second pivot shafts are arranged on the same axis extending in the left-right direction.

16. The keyboard device according to claim 14, wherein predetermined ribs of the plurality of ribs are formed such that part thereof is omitted in sham front-rear direction.

17. The keyboard device according to claim 14, wherein the plurality of chassis bodies have side walls formed into respective shapes complementary to each other on respective sides where two of the chassis bodies are connected to each other.

18. A keyboard device for a keyboard instrument, comprising:

a keyboard chassis;

a plurality of keys provided on the keyboard chassis and each extending a predetermined length in a front-rear direction, the keys being arranged in a state arranged side by side in a left-right direction and including white keys and black keys; and a plurality of key support mechanisms for the white keys and the black keys, each provided in a state engaged with the keyboard chassis and arranged side by side in the left-right direction, each for supporting an associated one of the keys from below, the plurality of key support mechanisms each causing, upon depression of the associated one of the keys, the depressed key to operate such that the key pivotally moves about a virtual pivot located rearward of a rear end of the key, wherein the key support mechanisms each include:

a first arm configured to extend a predetermined length in the front-rear direction and be swingably engaged with a first pivot shaft provided on the keyboard chassis, the first arm including a first arm front-side connecting portion which is disposed forward of the first pivot shaft and is pivotally and/or slidably connected to a key front-side connecting portion provided on a front portion of the associated key, and a second arm configured to extend a predetermined length in the front-rear direction and be swingably engaged with a second pivot shaft provided on the keyboard chassis at a location rearward of the first pivot shaft, the second arm including a second arm rear-side connecting portion which is disposed rearward of the second pivot shaft and is pivotally connected to a key rear-side connecting portion provided on a rear portion of the associated key, and a second arm front-side connecting portion which is disposed forward of the second pivot shaft and is pivotally and/or slidably connected to a first arm rear-side connecting portion rearward of the first pivot shaft of the first arm, and wherein in the key support mechanisms for the white keys and the black keys, at least either the first arms or the second arms are constructed similar to each other in shape and size.

19. The keyboard device according to claim 18, wherein the black keys are disposed such that front ends thereof are located rearward of front ends of the white keys, and wherein the key front-side connecting portion is provided, in a case where the key is a black key, in the vicinity of a front end of the key in the longitudinal direction of the key, and in a case where the key is a white key, at a location corresponding to the vicinity of a front end of the black key.

20. The keyboard device according to claim 18, wherein in both of the cases where the key is a white key and the key is a black key, the key rear-side connecting portion is provided at the same location in the longitudinal direction of the key.

21. The keyboard device according to claim 18, wherein the first arm includes:

an arm body extending in the front-rear direction and formed as a resin molded article, and a weight formed of a material larger in specific gravity than the arm body and mounted on a rear portion of the arm body in a manner extending rearward, wherein the weight to be mounted on the first arm is selected from a plurality of types of weights different in shape from each other, according to whether the key to which the first arm is connected is a white key or a black key.

* * * * *